(12) United States Patent
Yasugi et al.

(10) Patent No.: US 12,219,150 B2
(45) Date of Patent: Feb. 4, 2025

(54) VIDEO DECODING APPARATUS AND VIDEO CODING APPARATUS

(71) Applicant: SHARP KABUSHIKI KAISHA, Sakai (JP)

(72) Inventors: Yukinobu Yasugi, Sakai (JP); Tomohiro Ikai, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 65 days.

(21) Appl. No.: 18/104,793

(22) Filed: Feb. 2, 2023

(65) Prior Publication Data

US 2024/0098272 A1    Mar. 21, 2024

(30) Foreign Application Priority Data

Sep. 14, 2022   (JP) .................................. 2022-146436

(51) Int. Cl.
*H04N 19/176* (2014.01)
*H04N 19/105* (2014.01)
*H04N 19/14* (2014.01)
*H04N 19/159* (2014.01)

(52) U.S. Cl.
CPC .......... *H04N 19/14* (2014.11); *H04N 19/105* (2014.11); *H04N 19/159* (2014.11); *H04N 19/176* (2014.11)

(58) Field of Classification Search
CPC .... H04N 19/14; H04N 19/105; H04N 19/159; H04N 19/176
USPC .................................................... 375/240.02
See application file for complete search history.

(56) References Cited

U.S. PATENT DOCUMENTS

| | | | |
|---|---|---|---|
| 2011/0122950 A1* | 5/2011 | Ji .......................... | H04N 19/51 |
| | | | 375/E7.243 |
| 2021/0160482 A1* | 5/2021 | Chiu ...................... | H04N 19/59 |
| 2022/0116596 A1* | 4/2022 | Zhang .................. | H04N 19/132 |
| 2023/0156186 A1* | 5/2023 | Wang ................... | H04N 19/167 |
| | | | 375/240.02 |

(Continued)

OTHER PUBLICATIONS

Yi-Wen Chen et al., "AHG12: Enhanced bi-directional motion compensation", JVET-Y0125, Joint Video Experts Team (JVET) of ITU-T SG 16 WP 3 and ISO/IEC JTC 1/SC 29, 25th Meeting, by teleconference, Jan. 12-21, 2022.

(Continued)

*Primary Examiner* — Albert Kir
(74) *Attorney, Agent, or Firm* — ScienBiziP, P.C.

(57) ABSTRACT

Object
A video coding and decoding apparatus that can enhance coding efficiency is provided.
Solution
A video decoding apparatus includes an OOB determination unit configured to determine whether a reference block is a target of OOB processing by comparing coordinates of the reference block with coordinates of a picture, and an OOB mask derivation unit configured to derive mask data indicating whether a pixel is available by comparing coordinates of the pixel included in the reference block with the coordinates of the picture. The OOB determination unit determines whether the reference block is the target of the OOB processing based on presence or absence of processing to be applied to a reference picture including the reference block.

8 Claims, 10 Drawing Sheets

(56) References Cited

U.S. PATENT DOCUMENTS

2023/0247216 A1*  8/2023  Huang .................. H04N 19/44
                                                  375/240.15
2023/0328257 A1* 10/2023  Zhang .................. H04N 19/159
                                                  375/240.15

OTHER PUBLICATIONS

Xiaomi et al., "EE2-2.2: Motion compensated picture boundary padding", JVET-AA0096-v1, Joint Video Experts Team (JVET) of ITU-T SG 16 WP 3 and ISO/IEC JTC 1/SC 29, 27th Meeting, by teleconference, Jul. 13-Jul. 22, 2022, Jul. 6, 2022 (Jul. 6, 2022).
Xiaomi, "ECM fix for block-level out-of-bound checking", JVET-AA0097-v2, Joint Video Experts Team(JVET) of ITU-T SG 16 WP 3 and ISO/IEC JTC 1/SC 29, 27th Meeting, by teleconference, Jul. 13-Jul. 22, 2022, Jul. 14, 2022 (Jul. 14, 2022).

* cited by examiner

VIDEO DECODING APPARATUS AND VIDEO CODING APPARATUS

TECHNICAL FIELD

The embodiment of the present invention relates to a video decoding apparatus and a video coding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC, High-Efficiency Video Coding (HEVC), and Versatile Video Coding (VVC) schemes, and the like.

In such a video coding scheme, images (pictures) constituting a video are managed in a hierarchical structure including slices obtained by splitting an image, coding tree units (CTUs) obtained by splitting a slice, units of coding (which may also be referred to as coding units (CUs)) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction). In VVC, as in FIG. 8(a), coordinates of motion vectors are subjected to wrap-around processing, and thus motion compensation can be continuously performed between a left edge and a right edge of a picture in a horizontal coordinate system. Therefore, by applying the wrap-around processing to images whose right and left edges of a picture are spatially continuous, such as a 360-degree panoramic image and a 360-degree image, coding efficiency can be enhanced. In VVC, as in FIG. 8(b), Reference Picture Resampling (RPR) processing can be performed, in which motion compensation is performed with resolution being changed in units of pictures. By applying the RPR processing to services with a varying transmission rate, such as Internet video streaming, image quality can be enhanced.

NPL 1 discloses an Out-Of-Boundary (OOB) processing technique, in which a part or all of regions of one reference block of bi-prediction including a region out of a picture of a reference image are substituted with a part or all of regions of the other reference block.

CITATION LIST

Non Patent Literature

[NPL 1]
"AHG12: Enhanced bi-directional motion compensation", Joint Video Experts Team (WET) of ITU-T SG 16 WP 3 and ISO/IEC JTC 1/SC 29 25th Meeting, by teleconference, JVET-Y0125

SUMMARY OF INVENTION

Technical Problem

In the method described in NPL 1, in a case that the reference block includes a region out of the picture, a mask indicating the region out of the picture is derived and a bi-prediction image is derived. Accordingly, there is a problem in its large amount of calculation.

Solution to Problem

In order to solve the problem described above, a video decoding apparatus according to an aspect of the present invention includes an OOB determination unit configured to determine whether a reference block is a target of OOB processing by comparing coordinates of the reference block with coordinates of a picture, and an OOB mask derivation unit configured to derive mask data indicating whether a pixel is available by comparing coordinates of the pixel included in the reference block with coordinates of a picture boundary or a region boundary. The OOB determination unit determines whether the reference block is the target of the OOB processing based on presence or absence of processing to be applied to a reference picture including the reference block.

In the video decoding apparatus according to an aspect of the present invention, the OOB determination unit compares a valid region of an L0 reference region and a valid region of an L1 reference region, and invalidates OOB determination for the reference picture whose valid region of the reference region is larger.

Advantageous Effects of Invention

According to an aspect of the present invention, the amount of calculation required in OOB processing in video coding and decoding processing can be reduced.

DESCRIPTION OF EMBODIMENTS

First Embodiment

Hereinafter, an embodiment of the present invention will be described with reference to the drawings.

Figure 1:
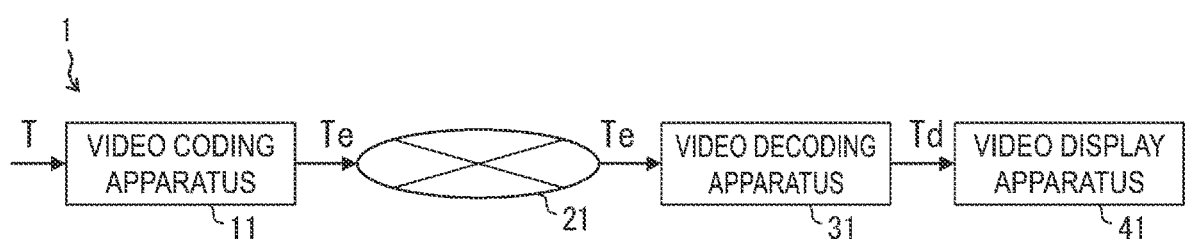
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-Luminescence (EL) display. Forms of the display include a stationary type, a mobile type, an HMD type, and the like. In a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

- $>>$ is a right bit shift, $<<$ is a left bit shift, & is a bitwise AND, | is a bitwise OR, |= is an OR assignment operator, and || indicates a logical sum.
- x?y:z is a ternary operator that takes y in a case that x is true (other than 0) and takes z in a case that x is false (0).
- Clip3(a, b, c) is a function to clip c in a value of a to b, and a function to return a in a case that c is less than a (c<a), return b in a case that c is greater than b (c>b), and return c in the other cases (provided that a is less than or equal to b (a<=b)).
- ClipH(o, W, x) is a function that returns x in a case that x<0, x-o in a case that x>W−1, and x in other cases.
- sign(a) is a function that returns 1 in a case that a>0, 1 in a case that a==0, and −1 in a case that a<0.
- abs (a) is a function that returns the absolute value of a.
- Int (a) is a function that returns the integer value of a.
- floor (a) is a function that returns the maximum integer equal to or less than a.
- ceil (a) is a function that returns the minimum integer equal to or greater than a.
- a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
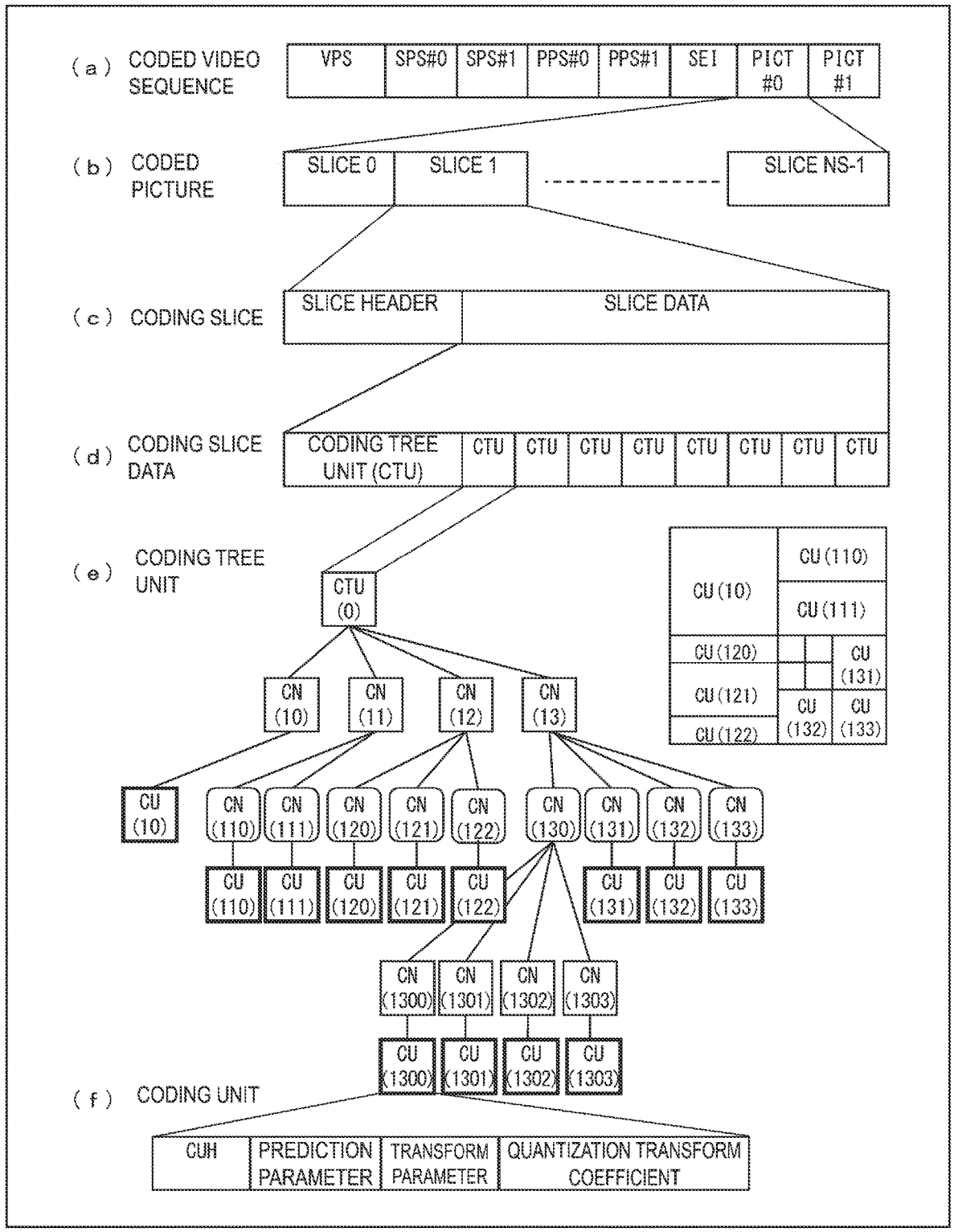
FIG. 2 is a diagram illustrating a hierarchical structure of data of a coding stream.

FIG. 2 is a diagram illustrating the hierarchy structure of data in the coding stream Te. The coding stream Te includes a sequence and multiple pictures constituting the sequence illustratively. (a) to (f) of FIG. 2 are diagrams illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit, respectively.

Coded Video Sequence

In the coded video sequence, a set of data referenced by the video decoding apparatus 31 to decode the sequence SEQ to be processed is defined. As illustrated in FIG. 2, the sequence SEQ includes a Video Parameter Set, a Sequence Parameter Set SPS, a Picture Parameter Set PPS, an Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referenced by the video decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referenced by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of the multiple PPSs is selected from each picture in a target sequence.

Coded Picture

In the coded picture, a set of data referenced by the video decoding apparatus 31 to decode the picture PICT to be processed is defined. As illustrated in FIG. 2, the picture PICT includes a slice 0 to a slice NS-1 (NS is the total number of slices included in the picture PICT).

Note that in a case that it is not necessary to distinguish each of the slice 0 to the slice NS-1 below, subscripts of reference signs may be omitted. The same applies to other data with subscripts included in the coding stream Te which will be described below.

Coding Slice

In the coding slice, a set of data referenced by the video decoding apparatus 31 to decode the slice S to be processed is defined. As illustrated in FIG. 2, the slice includes a slice header and slice data.

The slice header includes a coding parameter group referenced by the video decoding apparatus 31 to determine a decoding method for a target slice. Slice type specification information (slice type) specifying a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the video decoding apparatus 31 to decode the slice data to be processed is defined. The slice data includes a CTU as illustrated in FIG. 2(d). The CTU is a block of a fixed size (for example, 64×64) constituting a slice, and may also be called a Largest Coding Unit (LCU).

Coding Tree Unit

In FIG. 2, a set of data is defined that is referenced by the video decoding apparatus 31 to decode the CTU to be processed. The CTU is split into coding units CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node. The lowest coding node is defined as the coding unit.

Coding Unit

In FIG. 2, a set of data referenced by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

Prediction types (prediction modes) include intra prediction (MODE_INTRA), inter prediction (MODE_INTER), and intra block copy (MODE_IBC). The intra prediction refers to a prediction in an identical picture, and the inter prediction refers to prediction processing performed between different pictures (for example, between pictures of different display times, and between pictures of different layer images).

Transform and quantization processing is performed in units of CU, but the quantization transform coefficient may be subjected to entropy coding in units of subblock such as 4×4.

Prediction Parameter

A prediction image is derived by prediction parameters accompanying a block. The prediction parameters include prediction parameters for intra prediction and inter prediction.

Prediction Parameters for Inter Prediction

The prediction parameters for inter prediction will be described. The inter prediction parameters include prediction list utilization flags predFlagL0 and predFlagL1, reference picture indexes refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters include a merge flag merge_flag (general_merge_flag), a merge index merge_idx, merge_subblock_flag, regulare_merge_flag, ciip_flag, merge_gpm_partition_idx, merge_gpm_idx0, merge_gpm_idx1, inter_pred_idc, a reference picture index refIdxLX, mvp_LX_idx, a difference vector mvdLX, and a motion vector accuracy mode amvr_mode. merge_subblock_flag is a flag indicating whether inter prediction in units of subblocks is used. regulare_merge_flag is a flag indicating whether regular merge mode or MMVD is used. ciip_flag is a flag indicating whether a combined inter-picture merge and intra-picture prediction (CIIP) mode is used. merge_gpm_partition_idx is an index indicating a split shape of a GPM mode. merge_gpm_idx0 and merge_gpm_idx1 are each an index indicating a merge index of the GPM mode. inter_pred_idc is an inter prediction indicator for selecting a reference picture to be used in an AMVP mode. mvp_LX_idx is a prediction vector index for deriving a motion vector.

Reference Picture List

A reference picture list is a list including reference pictures stored in a reference picture memory 306. For individual CUs, which picture in a reference picture list RefPicListX (X=0 or 1) is actually referenced is specified with refIdxLX. Note that LX is a description method used in a case of not distinguishing an L0 prediction and an L1 prediction, and in the following description, distinguishes parameters for the L0 list and parameters for the L1 list by replacing LX with L0 and L1.

Merge Prediction and AMVP Prediction

A decoding (coding) method for prediction parameters includes a merge prediction (merge) mode (merge mode) and an Advanced Motion Vector Prediction or an adaptive motion vector prediction (AMVP) mode, and general_merge_flag is a flag to identify these modes. The merge mode is a prediction mode to omit a part or all of motion vector differences, and is a mode in which a prediction list utilization flag predFlagLX, the reference picture index refIdxLX, and a motion vector mvLX are derived from prediction parameters for neighboring blocks already processed, or the like, without being included in the coded data. The AMVP mode is a mode in which inter_pred_idc, refIdxLX, and mvLX are included in the coded data. Note that, mvLX is coded as mvp_LX_idx identifying a prediction vector mvpLX and a difference vector mvdLX. A prediction mode for omitting and simplifying the motion vector differences may be collectively referred to as a general merge mode, and general_merge_flag may be used for selecting the general merge mode and the AMVP prediction.

In a case that general_merge_flag is 1, regular_merge_flag may be transmitted separately. In a case that regular_merge_flag is 1, the regular merge mode or MMVD may be selected, and in other cases, the CIIP mode or the GPM mode may be selected. In the CIIP mode, a prediction image is generated using a weighted sum of an inter prediction image and an intra prediction image. In the GPM mode, a prediction image is generated as two non-rectangular prediction units obtained by splitting a target CU along a line segment.

inter_pred_idc is a value indicating the types and number of reference pictures, and takes any value of PRED_L0, PRED_L1, or PRED_BI. PRED_L0 and PRED_L1 indicate uni-predictions which use one reference picture managed in the L0 list and one reference picture managed in the L1 list, respectively. PRED_BI indicates a bi-prediction which uses two reference pictures managed in the L0 list and the L1 list.

merge_idx is an index to indicate which prediction parameter is used as a prediction parameter for the target block, among prediction parameter candidates (merge candidates) derived from blocks of which the processing is completed.

Motion Vector mvLX indicates a shift amount between blocks in two different pictures. A prediction vector and a difference vector related to mvLX are respectively referred to as mvpLX and mvdLX.

Inter Prediction Indicator inter_pred_idc and Prediction List Utilization Flag predFlagLX Relationships between inter_pred_idc and predFlagL0 and predFlagL1 are as follows, and can be transformed into one another.

$$\text{inter\_pred\_idc} = (\text{predFlagL1} << 1) + \text{predFlagL0}$$

$$\text{predFlagL0} = \text{inter\_pred\_idc} \& 1$$

$$\text{predFlagL1} = \text{inter\_pred\_idc} >> 1$$

Note that the inter prediction parameters may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred for identifying a bi-prediction can be derived from whether two prediction list utilization flags are both 1. For example, the derivation can be performed by the following expression.

$$\text{biPred} = (\text{predFlagL0} == 1 \,\&\&\, \text{predFlagL1} == 1)$$

Alternatively, biPred can be also derived from whether the inter prediction indicator is a value indicating the use of two prediction lists (reference pictures). For example, the derivation can be performed by the following expression.

$$\text{biPred} = (\text{inter\_pred\_idc} == \text{PRED\_BI}) ? 1 : 0$$

Configuration of Video Decoding Apparatus

Figure 3:
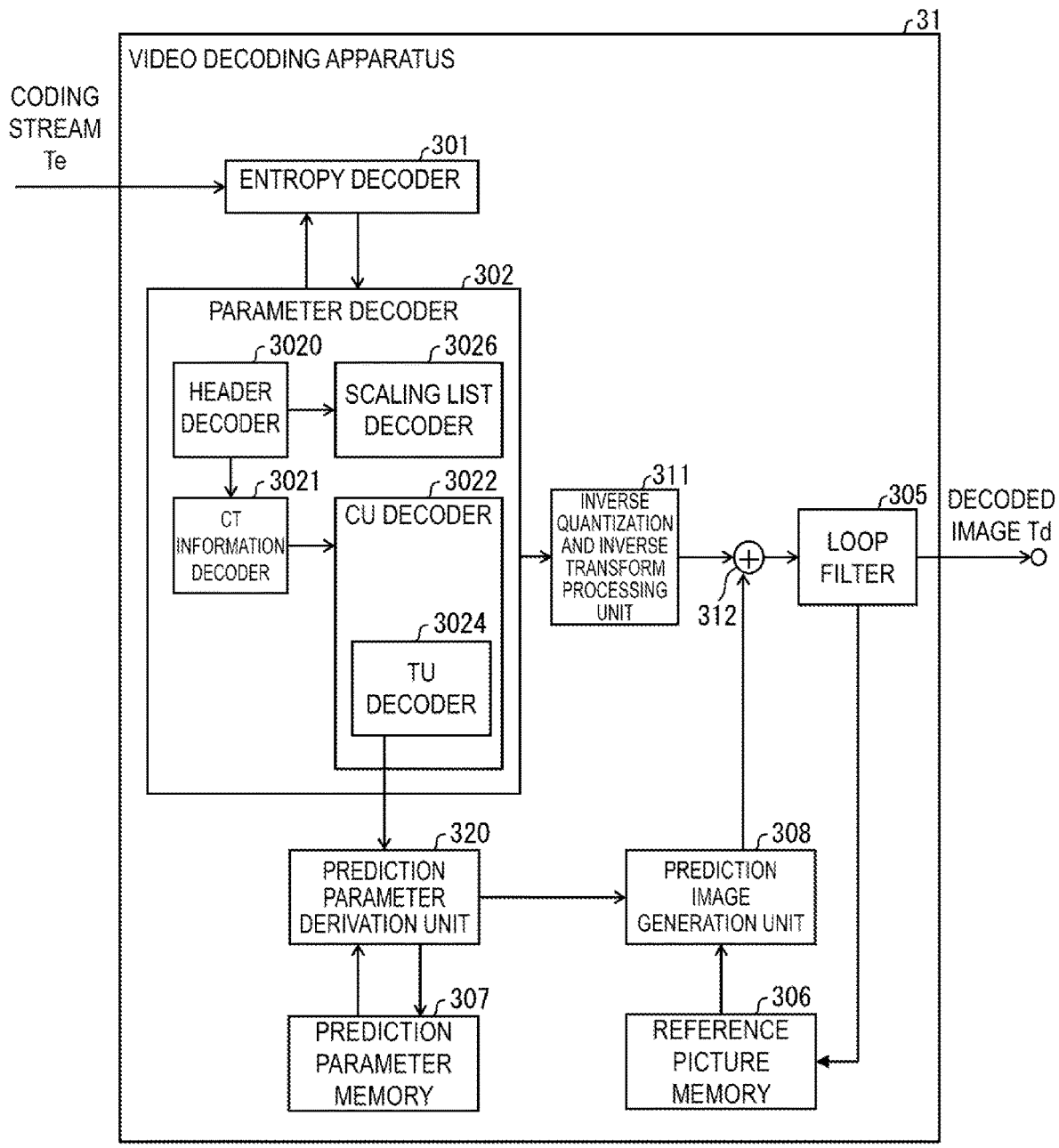
FIG. 3 is a schematic diagram illustrating a configuration of a video decoding apparatus.

The configuration of the video decoding apparatus 31 (FIG. 3) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and an APS, and a slice header (slice information). The CT information decoder 3021 decodes a CT from coded data. The CU decoder 3022 decodes a CU from coded data. The TU decoder 3024 decodes a CU from coded data.

In a case that a prediction error is included in the TU, the TU decoder 3024 decodes, from the coded data, QP update information and a quantization transform coefficient. The QP update information is a difference value from a quantization parameter prediction value qPpred, which is a prediction value of a quantization parameter QP.

The prediction image generation unit 308 includes an inter prediction image generation unit 309 (FIG. 4) and an intra prediction image generation unit 310.

The prediction parameter derivation unit 320 includes an inter prediction parameter derivation unit 303 (FIG. 5) and an intra prediction parameter derivation unit.

An example in which a CTU and a CU are used as units of processing is described below, but the processing is not limited to this example, and processing in units of sub-CU may be performed. Alternatively, the CTU and the CU may be replaced with a block, the sub-CU may be replaced with by a subblock, and processing may be performed in units of blocks or subblocks.

The entropy decoder 301 performs entropy decoding on the coding stream Te input from the outside and separates and decodes individual codes (syntax elements). The entropy coding includes a scheme in which syntax elements are subjected to variable-length coding by using a context (probability model) that is adaptively selected according to a type of the syntax elements and a surrounding condition, and a scheme in which syntax elements are subjected to variable-length coding by using a table or a calculation expression that is determined in advance.

The entropy decoder 301 outputs the decoded codes to the parameter decoder 302. The decoded code is, for example, a prediction mode predMode, general_merge_flag, merge_idx, inter_pred_idc, refIdxLX, mvp_LX_idx, mvdLX, amvr_mode, and the like. Which code is to be decoded is controlled based on an indication of the parameter decoder 302.

Basic Flow of Operation

Figure 6:
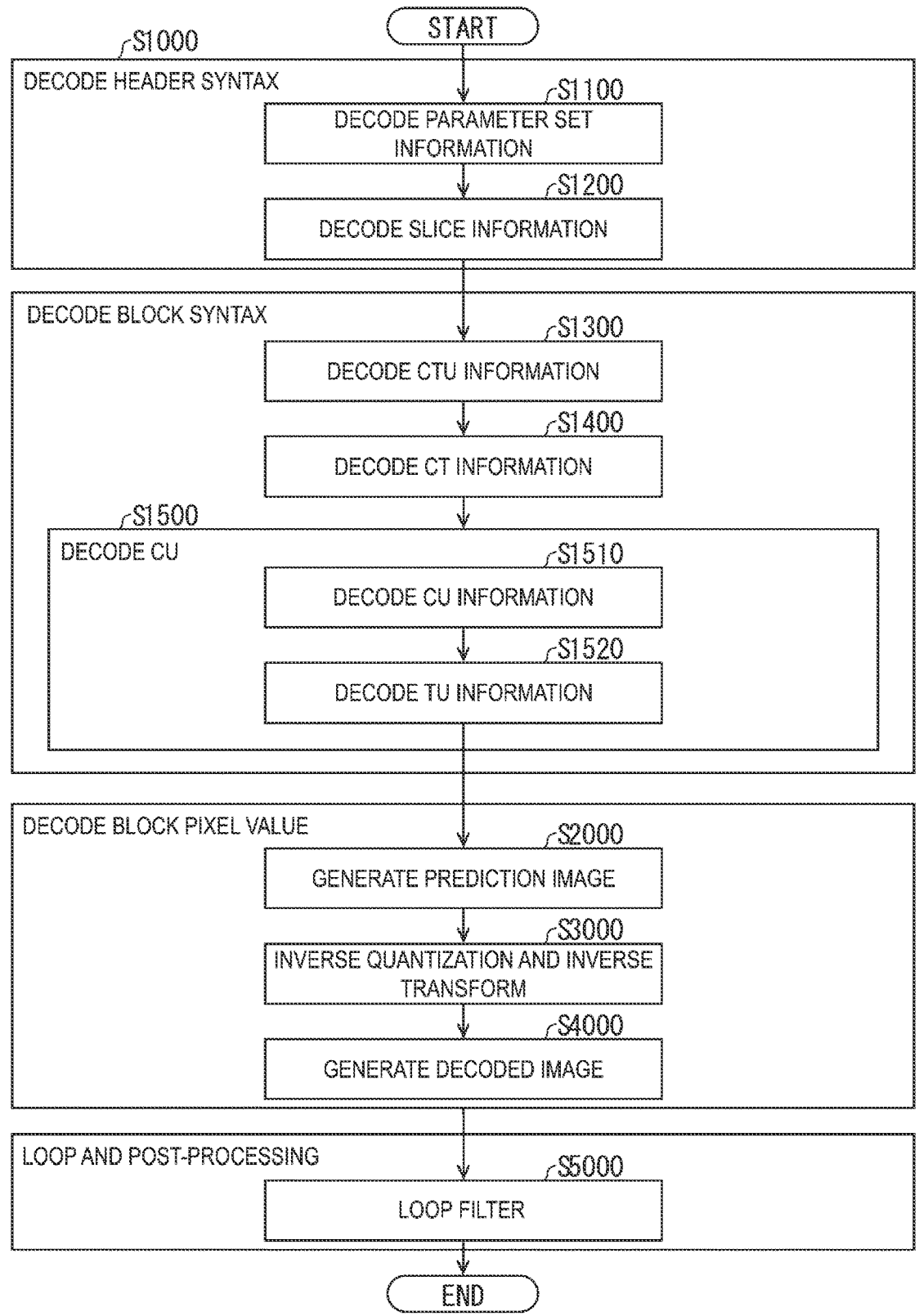
FIG. 6 is a flowchart illustrating general operation of the video decoding apparatus.

FIG. 6 is a flowchart illustrating general operation of the video decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag, CU residual flag, and the like from the coded data.

(S1520: Decoding of TU information) In a case that a prediction error is included in the TU, the TU decoder 3024 decodes a quantization prediction error and the like from the coded data.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoder 302, the prediction mode predMode separated by the entropy decoder 301, and the like.

To the prediction image generation unit 308, predMode, the prediction parameter, and the like are input. In addition, the prediction image generation unit 308 reads a reference picture from the reference picture memory 306. The prediction image generation unit 308 generates a prediction image of a block or a subblock by using the prediction parameter and the read reference picture (reference block) in the prediction mode indicated by predMode. Here, the reference block refers to a set of pixels (referred to as a block because they are normally rectangular) on a reference picture and is a region that is referenced for generating a prediction image.

Configuration of Inter Prediction Parameter Derivation Unit

Figure 5:
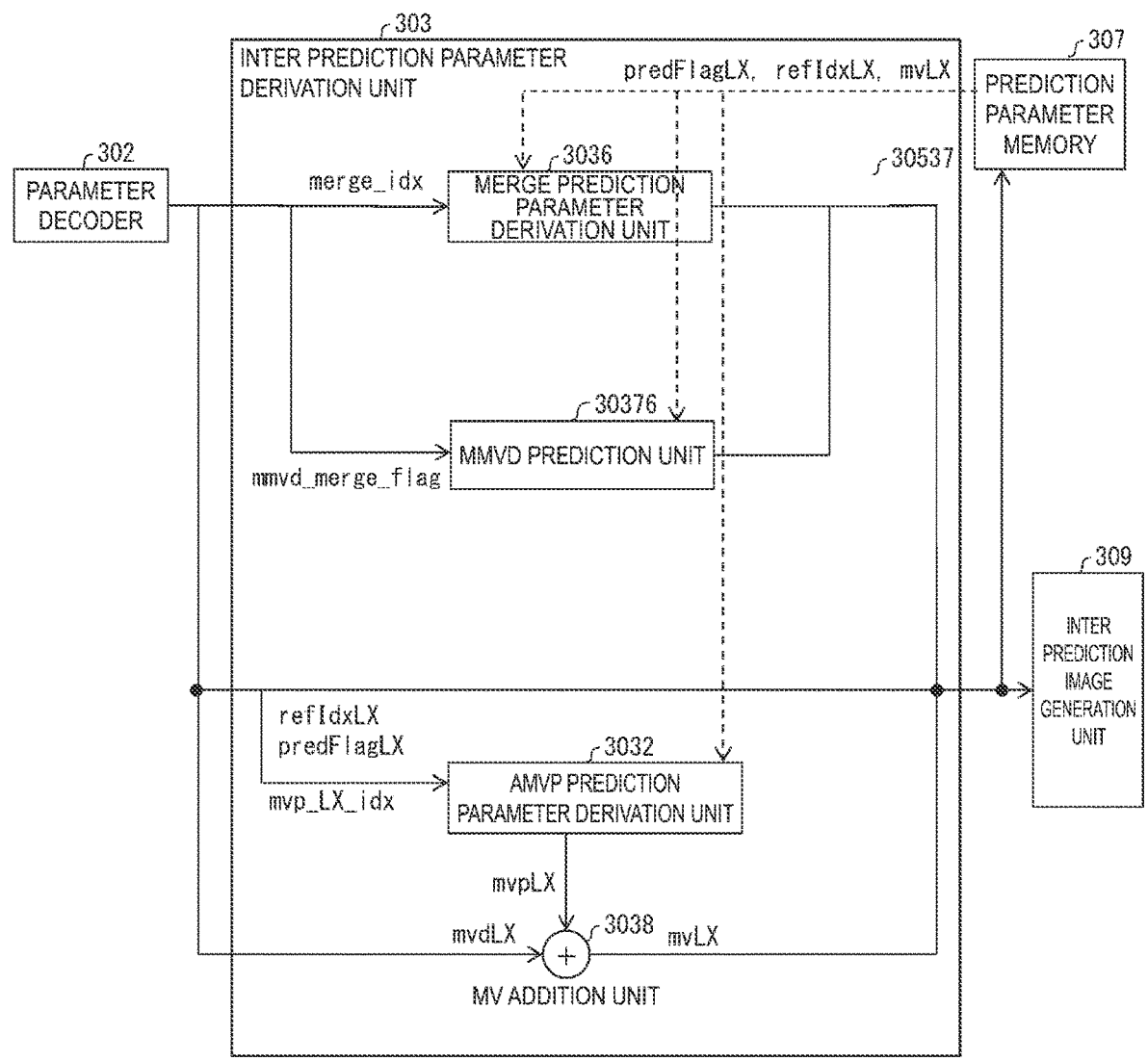
FIG. 5 is a schematic diagram illustrating a configuration of an inter prediction parameter derivation unit.

As illustrated in FIG. 5, the inter prediction parameter derivation unit 303 derives an inter prediction parameter with reference to the prediction parameters stored in the prediction parameter memory 307, based on the syntax element input from the parameter decoder 302. The inter prediction parameter derivation unit 303 outputs the inter prediction parameter to the inter prediction image generation unit 309 and the prediction parameter memory 307. The following are components common to the video coding apparatus and the video decoding apparatus, and may thus be collectively referred to as a motion vector derivation unit (motion vector derivation apparatus): the inter prediction parameter derivation unit 303 and the internal elements of the inter prediction parameter derivation unit 303 including an AMVP prediction parameter derivation unit 3032, a merge prediction parameter derivation unit 3036, an MMVD prediction unit 30376, and an MV addition unit 3038.

In a case that general_merge_flag indicates 1, in other words, the merge prediction mode, merge_idx is derived and output to the merge prediction parameter derivation unit 3036.

In a case that general_merge_flag indicates 0, in other words, the AMVP prediction mode, the AMVP prediction parameter derivation unit 3032 derives mvpLX from inter_pred_idc, refIdxLX, or mvp_LX_idx.

MV Addition Unit

In the MV addition unit 3038, mvpLX and mvdLX derived are added together to derive mvLX.

Merge Prediction

The merge prediction parameter derivation unit 3036 derives merge candidates including the prediction parameters (predFlagLX, mvLX, refIdxLX), and configures a merge candidate list. Moreover, among the merge candidates included in the merge candidate list, the merge prediction parameter derivation unit 3036 selects motion information (mvLXN[0], mvLXN[1]), predFlagLXN, and refIdxLXN of a merge candidate N indicated by merge_idx as the inter prediction parameters of the target block. The merge prediction parameter derivation unit 3036 stores the selected inter prediction parameters of the merge candidate in the prediction parameter memory 307 and outputs the selected inter prediction parameters to the inter prediction image generation unit 309.

Inter Prediction Image Generation Unit 309

In a case that predMode indicates the inter prediction, the inter prediction image generation unit 309 generates a prediction image of a block or a subblock by the inter prediction by using the inter prediction parameters input from the inter prediction parameter derivation unit 303 and the reference picture.

Figure 4:
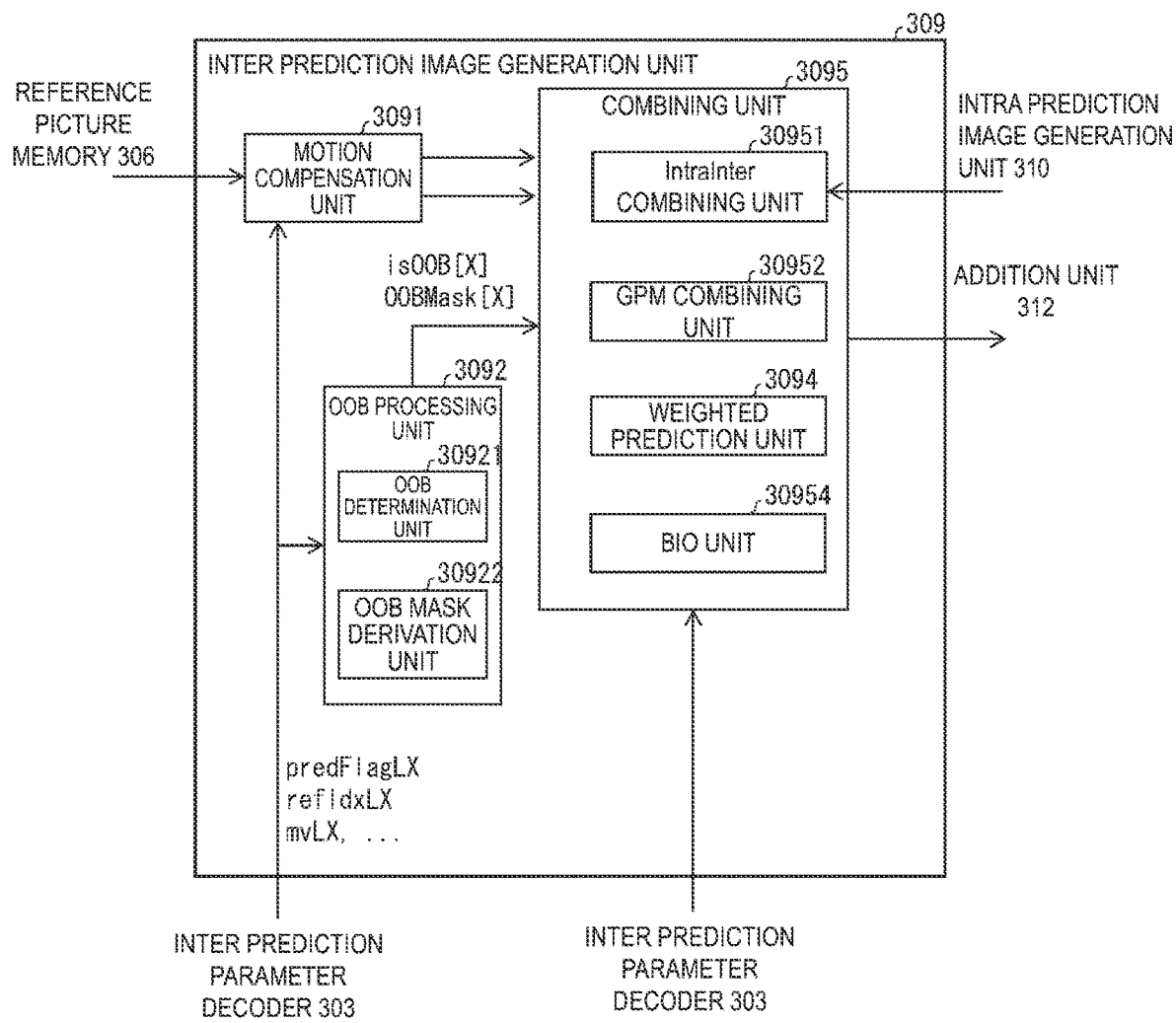
FIG. 4 is a schematic diagram illustrating a configuration of an inter prediction image generation unit.

FIG. 4 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091, an OOB processing unit 3092, and a combining unit 3095. The combining unit 3095 includes a weighted prediction unit 3094.

Motion Compensation

The motion compensation unit 3091 (interpolation image generation unit 3091) generates an interpolation image (motion compensation image) by reading a reference block from the reference picture memory 306 based on the inter prediction parameters (predFlagLX, refIdxLX, mvLX) input from the inter prediction parameter derivation unit 303. The reference block is a block located on the reference picture RefPicLX specified by refIdxLX, at a position shifted by mvLX from the position of the target block. Here, in a case that mvLX does not have an integer precision, an interpolation image is generated by using a filter referred to as a motion compensation filter and configured to generate pixels at fractional positions.

The motion compensation unit 3091 derives an integer position (xInt, yInt) and a phase (xFrac, yFrac) corresponding to top left coordinates (xPb, yPb) of a block having a size of bW*bH, coordinates (xL, yL) in a prediction block, and motion vectors (mvLX[0], mvLX[1]) by the following expression (MC-P1).

$$xInt = xPb + (mvLX[0] >> (\log 2MVPREC)) + xL$$

xFrac=mvLX[0]&(MVPREC−1)

yInt=yPb+(mvLX[1]>>(log 2MVPREC))+yL yFrac=mvLX[1]&(MVPREC−1)

Here, MVPREC represents accuracy of mvLX (1/MVPREC pixel accuracy), and log 2MVPREC=log 2(MVPREC), x=0, . . . , bW−1, and y=0, . . . , bH−1. For example, MVPREC may be 16.

Note that, in order to perform RPR, the derivation may be performed as in (MC-P2) to be described later. Moreover, for (xInt, yInt) derived in (MC-P1) and (MC-P2), the motion compensation unit 3091 may correct the position for wrap around.

In a case that a flag with a subpicture boundary being a picture boundary is enabled (sps_subpic_treated_as_pic_flag==1), and the number of subpictures of a reference image is greater than 1 (sps_num_subpics_minus1 for a reference image refPicLX>0), the following expression hold (MC-P2).

xInt=Clip3(SubpicLeftBoundaryPos, SubpicRightBoundaryPos, refWraparoundEnabledFlag? ClipH((PpsRefWraparoundOffset)*MinCbSizeY, picW, xInt): xnt)

yInt=Clip3(SubpicTopBoundaryPos, SubpicBotBoundaryPos, yInt) Here, SubpicLeftBoundaryPos, SubpicRightBoundaryPos, SubpicTopBoundaryPos, and SubpicBottomBoundaryPos are left, right, top, and bottom boundary positions of the subpicture, respectively.

Otherwise (a case that the flag with a subpicture boundary being a picture boundary is disabled (sps_subpic_treated_as_pic_flag==0), or the number of subpictures of the reference image is 1 (sps_num_subpics_minus1 for the reference image refPicLX==0)), the following expression hold (MC-P2).

xInt=Clip3(0, picW−1, refWraparoundEnabledFlag? ClipH((PpsRefWraparoundOffset)*MinCbSizeY, picW, xInt): xnt)

yInt=Clip3(0, picH−1, yInt)

Here, each parameter is set as follows.

refWraparoundEnabledFlag=*pps*_ref_wraparound_enabled_flag&&!refPicIsScaled

PpsRefWraparoundOffset=*pps*_pic_width_in_luma_samples/MinCbSizeY−*pps*_pic_width_minus_wraparound_offset MinCbSizeY is a prescribed constant or variable (for example, 4), and pps_pic_width_minus_wraparound_offset is an offset decoded from the coded data indicating the position of wrap around.

The motion compensation unit 3091 derives a temporary image temp[ ][ ] by performing horizontal interpolation processing on a reference picture refImg using an interpolation filter. In the expression below, Σ is the sum related to k of k=0, . . . , NTAP−1, mcFilter[Frac][k] is a k-th interpolation filter coefficient in the phase Frac, shift1 is a normalization parameter for adjusting a value range, and offset1=1<<(shift1−1).

temp[*x*][*y*]=(ΣmcFilter[xFrac][*k*]*refImg[xInt+*k*−NTAP/2+1][yInt]+offset1)>>shift1

Subsequently, the motion compensation unit 3091 derives an interpolation image Pred[ ][ ] by performing vertical interpolation processing on the temporary image temp[ ][ ]. In the expression below, Σ is the sum related to k of k=0, . . . , NTAP−1, shift2 is a normalization parameter for adjusting a value range, and offset2=1<<(shift2−1).

Pred[*x*][*y*]=(ΣmcFilter[yFrac][*k*]*temp[*x*][*y*+*k*−NTAP/2+1]+offset2)>>shift2     (Expression MC-1)

Weighted Prediction

The weighted prediction unit 3094 generates a prediction image of a block by multiplying an interpolation image PredLX by a weight coefficient.

Out-of-Picture (OOB) Processing

The OOB processing unit 3092 includes an OOB determination unit 30921 and an OOB mask derivation unit 30922. The GOB determination unit 30921 determines whether each reference block of the bi-prediction mode includes a region out of a valid range (an Out-Of-Boundary (OOB) region) of a reference picture, based on the inter prediction parameters (predFlagLX, refIdxLX, mvLX, and the like) input from the inter prediction parameter derivation unit 303.

Note that, in the determination, whether a region out of a valid range of a picture or a subpicture is included may be determined. The determination may be performed using whether a region out of a slice is included.

Figure 9:
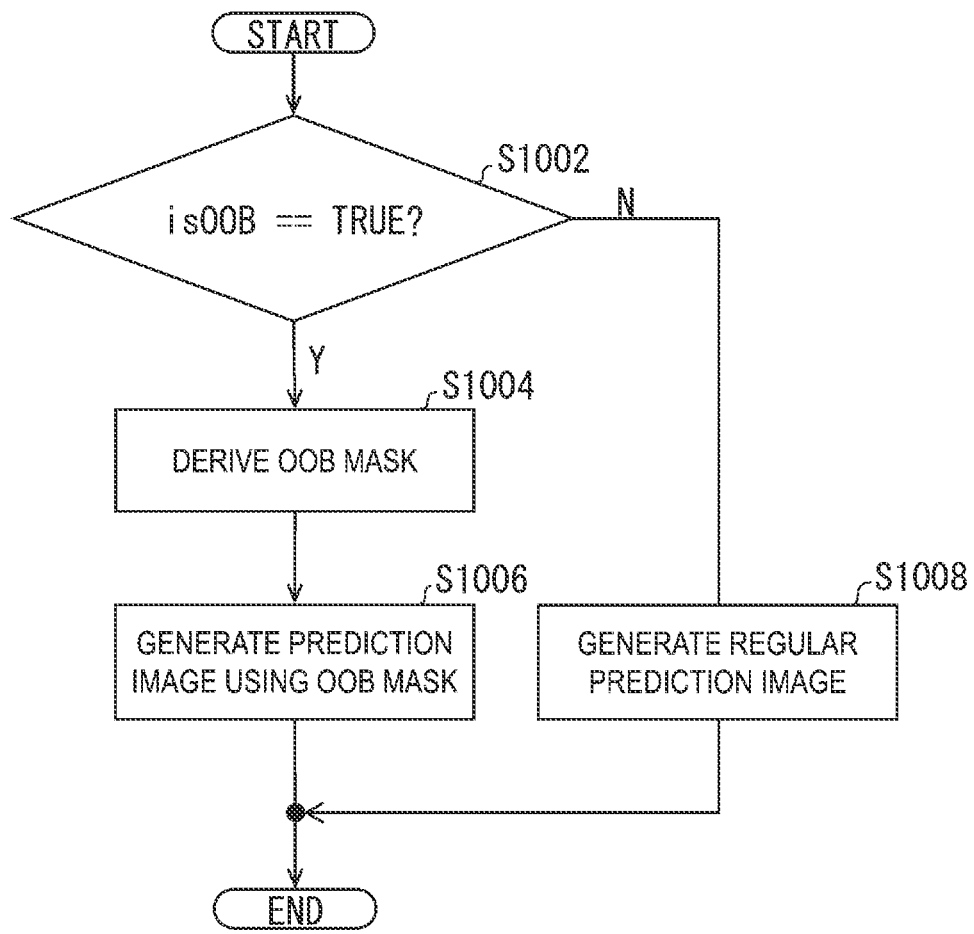
FIG. 9 is a flowchart illustrating general operation of OOB processing.

Description will be given with reference to FIG. 9.

In a case that the GOB determination unit 30921 determines that a part of pixels of the reference block is out of the picture (out of a valid range), that is, determines that the reference block is OOB (isOOB==true, S1002), the GOB mask derivation unit 30922 derives mask data (mask value, OOB mask) indicating which region in the reference block is out of the valid range (S1004). The inter prediction image generation unit 309 applies the GOB mask to the GOB reference block, and generates a prediction image (S1006). The inter prediction image generation unit 309 generates a regular prediction image for the non-GOB reference block (S1008). Details will be described below.

GOB Determination

In the bi-prediction, for two (first and second) reference blocks, the GOB determination unit 30921 determines whether a part of each reference block is out of the picture (OOB). A region of an LX reference block (X=0 or 1) corresponding to the reference image refPicLX is represented by block top left coordinates (xRefLX, yRefLX) and a block size (a width and a height: bW, bH). The width and the height of the picture are represented by picW and picH, respectively. Note that, in the following, values obtained by converting mvLX into integers according to accuracy MVPREC of mvLX are used in the coordinate system. With the use of these values, the GOB determination unit 30921 derives a truth value isOOB[X] for representing whether the LX reference block includes a region out of the picture (out of the valid range), according to the following expression. A region inside the valid range is referred to as a valid region.

Figure 10:
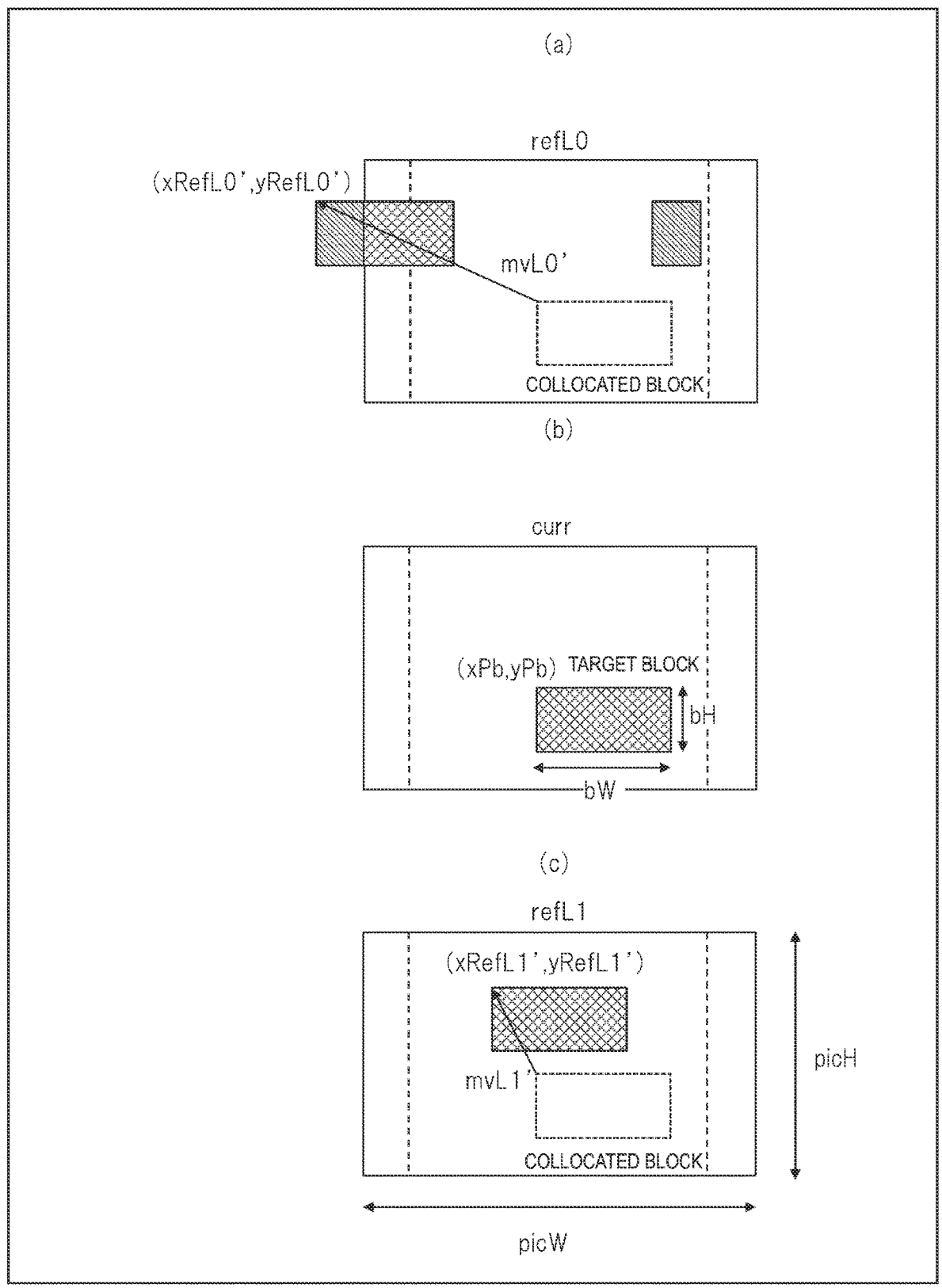
FIG. 10 is a schematic diagram illustrating an example of OOB determination.

An example is illustrated in FIG. 10. FIG. 10 is a diagram in integer units, and a motion vector mvLX' and a reference pixel position (xRefLX', yRefLX') are parameters being integer expressions of the motion vector mvLX and the reference pixel position (xRefLX, yRefLX). Although the figure illustrates an example of X=0, the same applies to a case of X=1.

xRefLX=(*xPb*<<log 2MVPREC)+mvLX[0](DecideOOB1)

yRefLX=(*yPb*<<log 2MVPREC)+mvLX[1]

picMinX=0−MVPREC/2 picMinY=0−MVPREC/2 picMaxX=((picW−1)<<log 2MVPREC)+MVPREC/2 picMaxY=((picH−1)<<log 2MVPREC)+MVPREC/2 isOOB[X]=(xRefLX<picMinX)||(yRefLX<picMinY)||
(xRefLX+(bW<<log 2MVPREC)−1>=picMaxX)
(yRefLX+(bH<<log 2MVPREC)−1>=picMaxY)

log 2MVPREC bit left shift ("<<log 2MVPREC") may be processed with multiplication by MVPREC ("*MVPREC"), or "*MVPREC" to be described later may be processed with "<<log 2MVPREC".

Alternatively, the derivation expression of isOOB[X] in (DecideOOB1) may be the following expression.

isOOB[X]=(xRefLX<=picMinX)||
(yRefLX<=picMinY)||(xRefLX+(bW<<log
2MVPREC)−1>=picMaxX)||(yRefLX+(bH<<log
2MVPREC)−1>=picMaxY)

Alternatively, the GOB determination unit 30921 may perform determination in a simplified manner as follows, with omission of terms for rounding.

picMaxX=(picW−1)<<log 2MVPREC(DecideOOB2)

picMaxY=(picH−1)<<log 2MVPREC isOOB[X]=(xRefLX<0)||(yRefLX<0)||(xRefLX+
(bW<<log 2MVPREC)−1>picMaxX)||(yRefLX+
(bH<<log 2MVPREC)−1>pixMaxY)

The OOB determination unit 30921 may perform determination with coordinates in integer units, instead of boundary coordinates in fractional sample units.

xRefLX=xPb+(mvLX[0]>>log 2MVPREC)(DecideOOB3)

yRefLX=yPb+(mvLX[1]>>log 2MVPREC)

isOOB[X]=(xRefLX<0)||(yRefLX<0)||(xRefLX+bW−
1>=picW−1)||(yRefLX+bH+1>=picH−1)

Alternatively, the derivation expression of isOOB[X] in (DecideOOB3) may be the following expression.

isOOB[X]=(xRefLX<=0)(yRefLX<=0)||(xRefLX+
bW−1>=picW−1)||(yRefLX+bH+1>=picH−1)

According to the above, integer coordinates obtained by right shift with MV accuracy of the motion vector mvLX[ ] are used, and therefore there is an effect that the amount of processing can be simplified in comparison to determination with fractional sample accuracy.

The OOB determination unit 30921 may switch between application and no application of the OOB processing, depending on the block size. For example, the OOB determination unit 30921 may set isOOB=true only for a block whose width and height respectively have BLKTHW1 and BLKTHH1 pixels or more, and apply the OOB processing, with the use of the following expression for derivation of isOOB[X].

isOOB[X]=((bW>=BLKTHW1)&&
(bH>=BLKTHH1))&&((xRefLX<picMinX)||
(yRefLX<PieMinY)||(xRefLX+bW*MVPREC−
1>=picMaxX)||(yRefLX+bH*MVPREC−
1>=picMaxY))

Here, applying the OOB processing is equivalent to setting isOOB[X]=true. This means deriving the prediction image Pred[ ][ ] by preferentially using a certain reference image without weighting in the weighted prediction unit 3094.

Alternatively, isOOB[X] may be derived according to the following expression.

isOOB[X]=(bW>=BLKTHW1)&&(bH>=BLKTHH1)
&&((xRefLX<=picMinX)||(yRefLX<=PieMinY)
||(xRefLX+(bW<<log 2MVPREC)−1>=pic-
MaxX)||(yRefLX+(bH<<log 2MVPREC)−
1>=picMaxY))

Alternatively, isOOB[X] may be derived according to the following expression.

picMaxX=(picW−1)<<log 2MVPREC picMaxY=(picH−1)<<log 2MVPREC isOOB[X]=(bW>=BLKTHW1)&&(bH>=BLKTHH1)
&&((xRefLX<0)||(yRefLX<0)||(xRefLX+
(bW<<log 2MVPREC)−1>picMaxX)||(yRefLX+
(bH<<log 2MVPREC)−1>pixMaxY))

Alternatively, isOOB[X] may be derived according to the following expression.

xRefLX=xPb+(mvLX[0]>>log 2MVPREC)

yRefLX=yPb+(mvLX[1]>>log 2MVPREC)

isOOB[X]=(bW>=BLKTHW1)&&(bH>=BLKTHH1)
&& ((xRefLX<0)||(yRefLX<0)||(xRefLX+bW−
1>=picW−1)||(yRefLX+bH−1>=picH−1))

Alternatively, isOOB[X] may be derived according to the following expression.

isOOB[X]=(bW>=BLKTHW1)&&(bH>=BLKTHH1)
&&((xRefLX<=0)||(yRefLX<=0)||(xRefLX+bW−
1>=picW−1)||(yRefLX+bH−1>=picH−1))

For example, BLKTHW1 may be 4, 8, 16, or 32, BLKTHH1 may be 4, 8, 16, or 32, or the like. A threshold of the block size to which OOB is applied may be 8×8, 4×4, 4×8, 8×4, 16×16, or the like.

Alternatively, the OOB processing may be prohibited in large blocks.

isOOB[X]=(bW<=BLKTHW2)&&
(bH<=BLKTHW2)&&((xRefLX<picMinX)||
(yRefLX<PieMinY)||(xRefLX+bW*MVPREC−
1>=picMaxX)||(yRefLX+bH*MVPREC−
1>=picMaxY))

Alternatively, isOOB[X] may be derived according to the following expression.

isOOB[X]=(bW<=BLKTHW2)&&
(bH<=BLKTHW2)&&((xRefLX<=picMinX)||
(yRefLX<=PieMinY)||(xRefLX+(bW<<log
2MVPREC)−1>=picMaxX)||(yRefLX+(bH<<log
2MVPREC)−1>=picMaxY))

Alternatively, isOOB[X] may be derived according to the following expression.

picMaxX=(picW−1)<<log 2MVPREC picMaxY=(picH−1)<<log 2MVPREC isOOB[X]=(bW<=BLKTHW2)&&
(bH<=BLKTHW2)&& ((xRefLX<0)||(yRe-
fLX<0)||(xRefLX+(bW<<log 2MVPREC)−
1>picMaxX)||(yRefLX+(bH<<log 2MVPREC)−
1>pixMaxY))

Alternatively, isOOB[X] may be derived according to the following expression.

xRefLX=xPb+(mvLX[0]>>log 2MVPREC)

yRefLX=yPb+(mvLX[1]>>log 2MVPREC)

```
isOOB[X]=(bW<=BLKTHW2)&&
    (bH<=BLKTHW2)&&((xRefLX<0)||(yRe-
    fLX<0)||(xRefLX+bW-1>=picW-1)||(yRefLX+
    bH-1>=picH-1))
```

Alternatively, isOOB[X] may be derived according to the following expression.

```
xRefLX=xPb+(mvLX[0]>>log 2MVPREC)

yRefLX=yPb+(mvLX[1]>>log 2MVPREC)

isOOB[X]=(bW<=BLKTHW2)&&
    (bH<=BLKTHW2)&&((xRefLX<=0)||(yRe-
    fLX<=0)||(xRefLX+bW-1>=picW-1)||(yRefLX+
    bH-1>=picH-1))
```

For example, BLKTHW2 may be 16, 32, or 64, BLKTHH2 may be 16, 32, or 64, or the like.

Alternatively, the OOB processing may be applied only to blocks having a specific range of size.

```
isOOB[X]=(bW>BLKTHW3)&&(bW<=BLKTHW4)
    &&(bH>BLKTHH3)&&(bH<=BLKTHH4)&&
    ((xRefLX<picMinX)||(yRefLX<picMinY)||(xRe-
    fLX+bW*MVPREC-1>=picMaxX)||(yRefLX+
    bH*MVPREC-1>=picMaxY))
```

Alternatively, isOOB[X] may be derived according to the following expression.

```
isOOB[X]=(bW>BLKTHW3)&&(bW<=BLKTHW4)
    &&(bH>BLKTHH3)&&(bH<=BLKTHH4)&&
    ((xRefLX<=picMinX)(yRefLX<=picMinY)
    (xRefLX+bW<<log 2MVPREC)-1>=picMaxX)
    (yRefLX+(bH<<log 2MVPREC)-
    1>=picMaxY))
```

Alternatively, isOOB[X] may be derived according to the following expression.

```
picMaxX=(picW-1)<<log 2MVPREC picMaxY=(picH-1)<<log 2MVPREC isOOB[X]=(bW>BLKTHW3)&&(bW<=BLKTHW4)
    &&(bH>BLKTHH3)&&(bH<=BLKTHH4)&&
    ((xRefLX<0)(yRefLX<0)||(xRefLX+(bW<<log
    2MVPREC)-1>picMaxX)(yRefLX+(bH<<log
    2MVPREC)-1>pixMaxY))
```

Alternatively, isOOB[X] may be derived according to the following expression.

```
xRefLX=xPb+(mvLX[0]>>log 2MVPREC)

yRefLX=yPb+(mvLX[1]>>log 2MVPREC)

isOOB[X]=(bW>BLKTHW3)&&(bW<=BLKTHW4)
    &&(bH>BLKTHH3)&&(bH<=BLKTHH4)&&
    ((xRefLX<0)(yRefLX<0)||(xRefLX+bW-
    1>=picW-1)||(yRefLX+bH-1>=picH-1))
```

Alternatively, isOOB[X] may be derived according to the following expression.

```
isOOB[X]=(bW>BLKTHW3)&&(bW<=BLKTHW4)
    &&(bH>BLKTHH3)&&(bH<=BLKTHH4)&
    ((xRefLX<=0)||(yRefLX<=0)||(xRefLX+bW-
    1>=picW-1)||(yRefLX+bH-1>=picH-1))
```

For example, (BLKTHW3, BLKTHW4) may be {(4, 16), (8, 32), (16, 32), (32, 64)}, (BLKTHH3, BLKHH4) may be {(4, 16), (8, 32), (16, 32), (32, 64)}, or the like.

Alternatively, the OOB processing may be applied, with determination being made depending on the size of areas.

```
isOOB[X]=(bW*bH>=BLKTHW5*BLKTHH5)&&
    ((xRefLX<picMinX)||(yRefLX<picMinY)||(xRe-
    fLX+bW*MVPREC-1>=picMaxX)||(yRefLX+
    bH*MVPREC-1>=picMaxY))
```

Alternatively, isOOB[X] may be derived according to the following expression.

```
isOOB[X]=(bW*bH>=BLKTHW5*BLKTHH5)&&
    ((xRefLX<=picMinX)||(yRefLX<=picMinY)||
    (xRefLX+(bW<<log 2MVPREC)-1>=picMaxX)
    ||(yRefLX+(bH<<log 2MVPREC)-
    1>=picMaxY))
```

Alternatively, isOOB[X] may be derived according to the following expression.

```
picMaxX=(picW-1)<<log 2MVPREC picMaxY=(picH-1)<<log 2MVPREC isOOB[X]=(bW*bH>=BLKTHW5*BLKTHH5)&&
    ((xRefLX<0)||(yRefLX<0)||(xRefLX+(bW<<log
    2MVPREC)-1>picMaxX)||(yRefLX+(bH<<log
    2MVPREC)-1>pixMaxY))
```

Alternatively, isOOB[X] may be derived according to the following expression.

```
xRefLX=xPb+(mvLX[0]>>log 2MVPREC)

yRefLX=yPb+(mvLX[1]>>log 2MVPREC)

isOOB[X]=(bW*bH>=BLKTHW5*BLKTHH5)&&
    ((xRefLX<0)||(yRefLX<0)||(xRefLX+bW-
    1>=picW-1)||(yRefLX+bH-1>=picH-1))
```

Alternatively, isOOB[X] may be derived according to the following expression.

```
isOOB[X]=(bW*bH>=BLKTHW5*BLKTHH5)&&
    ((xRefLX<=0)||(yRefLX<=0)||(xRefLX+bW-
    1>=picW-1)||(yRefLX+bH-1>=picH-1))
```

For example, BLKTHW5 may be 4, 8, 16, or 32, BLKTHH5 may be 4, 8, 16, or 32, or the like. Alternatively, BLKTHS5 may be used instead of BLKTHW5*BLKTHH5. For example, BLKTHS5 may be 32, 64, 128, or the like.

In the above example, a condition of restricting the block size based on the OOB determination expression of (DecideOOB1) is added. However, a condition of restricting the block size based on the OOB determination expression of (DecideOOB2) or (DecideOOB3) may be added.

In the above example, (xRefLX<picMinX)|| (yRefLX<picMinY) is used as a part of conditions of the derivation expression of isOOB[X]. However, (xRefLX<=picMinX)|| (yRefLX<=picMinY) may be used.

As described above, the block size to which the OOB processing is applied can be restricted, and the amount of calculation can be reduced.

The OOB determination unit 30921 may be configured to prevent both of isOOB[X] and isOOB[1-X] (X=0, 1) from being 1. In other words, in both of the reference blocks, the inter prediction image generation unit 309 is prohibited from generating the prediction image using the OOB mask. With this, isOOB[X]=false, in other words, without using the OOB processing, is invariably applied to one of the reference blocks, and creation of the OOB mask and application of the mask can be omitted in a later stage. Therefore, the amount of calculation can be reduced.

Example 1 of OOB Determination Omission Configuration

The OOB determination unit 30921 may derive isOOB [X] (X=0, 1), according to determination depending on the sizes of the valid ranges of an L0 reference region and an L1 reference region. Among the LX reference blocks, an LX reference block having the larger valid area InsideAreaX included in the picture is represented by X=K (K=0, 1). The OOB determination for the reference picture having a larger valid area is invalidated (OOB determination presence/absence flag isOOB[K]=false), and the OOB determination for the other reference picture having a smaller valid area (isOOB[!K] or isOOB[1-K]) is validated (isOOB[1-K]= true). The OOB determination unit 30921 derives InsideAreaX according to the following expression, for example. Note that, as a value of (false, true), (0, 1) may be used, or another value (1, 0) may be used. The valid range of the LX reference region may be derived in a common part of the LX reference block and the picture.

xRefLX=*xPb*\*MVPREC+mvLX[0]

yRefLX=*yPb*\*MVPREC+mvLX[1]

picMinX=0-MVPREC/2 picMinY=0-MVPREC/2 picMaxX=(picW-1)\*MVPREC+MVPREC/2 picMaxY=(picH-1)\*MVPREC+MVPREC/2

InsideWidthX=(min(picMaxX,xRefLX+
  *bW*\*MVPREC-1)-max(picMinX,xRefLX))

InsideHeightX=(min(picMaxY,yRefLX+
  *bH*\*MVPREC-1)-max(picMinY,yRefLX))

InsideAreaX=(InsideWidthX>0&& Inside-
  HeightX>0)?InsideWidthX\*InsideHeightX:0

In a case that a value of InsideWidthX or InsideHeightX is negative, the reference block does not have a part in common with the picture (the reference block is not included in the picture), and thus InsideAreaX may be 0.

In multiplication of the size (picW, picH, bW, bH) and the accuracy MVPREC, the size may be processed with left bit shift "<<" with a logarithm of MVPREC as follows.

xRefLX=(*xPb*<<log 2MVPREC)+mvLX[0]

yRefLX=(*yPb*<<log 2MVPREC)+mvLX[1]

Alternatively, picMaxX and picMaxY may be derived as follows.

picMaxX=(picW-1)\*MVPREC picMaxY=(picH-1)\*MVPREC

Alternatively, xRefLX and yRefLX may be derived in coordinates in integer units, instead of boundary coordinates in fractional sample units.

xRefLX=*xPb*+mvLX[0]\*MVPREC yRefLX=*yPb*+mvLX[1]\*MVPREC

The OOB determination unit 30921 derives InsideArea0 and InsideArea1 for the L0 reference block and the L1 reference block, respectively, and derives isOOB[X] as follows.

```
if (InsideArea0 >= InsideArea1) {
    isOOB[0] = false, isOOB[1] = true
} else
    isOOB[0] = true, isOOB[1] = false
}
```

As in the following, a determination value of one isOOB[X] may be derived first, and then a determination value of the other isOOB[Y] (Y=1-X) may be derived from the determination value of isOOB[X].

isOOB[0]=(InsideArea0>=InsideArea1)?0:1 isOOB[1]=1-isOOB[0]

In the above conditional expression, "InsideArea0>InsideArea1" may be used.

According to the above configuration, the OOB determination can be omitted (the OOB processing is not applied) with the OOB determination in the reference picture having a larger valid region being invalidated (flag isOOB[K]= false), and therefore the amount of calculation in generation of the prediction image can be reduced. In particular, in a case that the valid region is large, there is substantially no reduction in image quality even in a case that the OOB determination is invalidated.

Example 2 of OOB Determination Omission Configuration

In a case that the sizes of the valid regions InsideArea related to two reference images are equal to each other, the OOB determination unit 30921 may invalidate the OOB determination for both of the reference images. Specifically, isOOB[X] may be derived such that a value (false) indicating omission of the OOB determination is obtained.

```
if (InsideArea0 > InsideArea1) {
    isOOB[0] = false, isOOB[1] = true
} else if (InsideArea0 < InsideArea1) {
    isOOB[0] = true, isOOB[1] = false
} else
    isOOB[0] = false, isOOB[1] = false
}
```

According to the above configuration, the amount of calculation in generation of the prediction image can be reduced.

Example 3 of OOB Determination Omission Configuration

The OOB determination unit 30921 may derive the OOB determination presence/absence flag isOOB[X] by using a magnitude relationship of InsideWidthX and InsideHeightX representing the horizontal and vertical sizes of the valid ranges of the LX reference regions (for example, the common part of the LX reference block and the picture). For example, in a case that both of the width and the height of the valid region of a certain LX reference block are larger than the width and the height of the other LY reference block (Y=1-X), the OOB determination for the LX reference block may be invalidated (isOOB=false).

```
if (InsideWidth0 > InsideWidth1 && InsideHeight0 > InsideHeight1) {
    isOOB[0] = false, isOOB[1] = true
} else {
    isOOB[0] = true, isOOB[1] = false
}
```

Alternatively, the following may be used.

```
if (InsideWidth0 >= InsideWidth1 && InsideHeight0 > InsideHeight1) {
    isOOB[0] = false, isOOB[1] = true
```

-continued

```
} else {
  isOOB[0] = true, isOOB[1] = false
}
```

Alternatively, the following may be used.

```
if (InsideWidth0 >= InsideWidth1 && InsideHeight0 >= InsideHeight1) {
  isOOB[0] = false, isOOB[1] = true
} else {
  isOOB[0] = true, isOOB[1] = false
}
```

Alternatively, in the case that both of the width and the height of the valid region of a certain LX reference block are larger than the width and the height of the other LY reference block (Y=1−X), the OOB determination for the LX reference block may be invalidated (isOOB=false), and in a case that the widths and the heights of the two valid regions are equal to each other, the OOB determination for both of the reference blocks may be invalidated.

```
if (InsideWidth0 > InsideWidth1 && InsideHeight0 > InsideHeight1) {
  isOOB[0] = false, isOOB[1] = true
} else if (InsideWidth0 < InsideWidth1 && InsideHeight0 <
InsideHeight1) {
  isOOB[0] = true, isOOB[1] = false
} else {
  isOOB[0] = false, isOOB[1] = false
}
```

Alternatively, the OOB determination may be performed by using only the widths or only the heights in the above determination.

```
if (InsideWidth0 > InsideWidth1) {
  isOOB[0] = false, isOOB[1] = true
} else {
  isOOB[0] = true, isOOB[1] = false
}
```

Alternatively, the following may be used.

```
if (InsideHeight0 > InsideHeight1) {
  isOOB[0] = false, isOOB[1] = true
} else {
  isOOB[0] = true, isOOB[1] = false
}
```

According to the above configuration, the OOB determination for a reference block having a large valid region (or both of the reference blocks) can be omitted, and therefore the amount of calculation in generation of the prediction image can be reduced. In addition, this eliminates the need of deriving areas, and therefore the amount of calculation of multiplication can be reduced.

Supplement

To sum up the above, the valid region of the L0 reference region and the valid region of the L1 reference region are compared with each other, and the OOB determination for the reference picture having a larger reference region may be invalidated. Determination as to whether the reference region is large may be performed by comparing the areas of the valid regions of L0 and L1. Determination as to whether the reference region is large may be performed by comparing the widths or the heights of the valid regions of L0 and L1.

OOB Mask Derivation Processing

The OOB mask derivation unit 30922 derives the OOB mask (OOBMask[X]) for the reference block. OOBMask[X] is a binary image (mask) having bW×bH pixels. In a case that a value of OOBMask[X][px][py] (px=0, bW−1, py=0, bH−1) is 0 (false), it is indicated that the pixel (px, py) is inside the picture, and in a case that the value is 1 (true), it is indicated that the pixel (px, py) is out of the picture. Note that false and true are not limited to 0 and 1, and other values may be used, such as binary bit mask values "0000000000b" and "1111111111b" constituted of a string of 0 or 1 and having a length of BitDepth or longer, for example. Hexadecimal numbers of "000" and "3FF", "000" and "FFF", and "0000" and "FFFF" may be used. The OOB mask derivation unit 30922 sets all of the values of OOBMask[X] equal to false for a block determined as not an OOB processing target (isOOB[X]==false) by the OOB determination unit 30921. The OOB mask derivation unit 30922 derives the mask by using the following expression for a block determined as an OOB processing target (isOOB[X] true) by the OOB determination unit 30921. Note that a sign of inequality (">=" or "<=") need not include a sign of equality (">" or "<").

$$xRefLX=(xPb<<\log 2MVPREC)+mvLX[0]$$

$$yRefLX=(yPb<<\log 2MVPREC)+mvLX[1]$$

$$OOBMask[X][px][py]=((xRefLX+px<picMinX)||\\(yRefLX+py<PieMinY)||(xRefLX+\\px>=picMaxX)||(yRefLX+py>=picMaxY))?1:0$$

Note that px=0, bW−1, and py=0, bH−1. In the above, OOBMask is derived based on the determination expression of isOOB[X] in (DecideOOB1). In addition to this, OOBMask may be derived based on the determination expression of isOOB[X] in (DecideOOB2) and (DecideOOB3). Moreover, OOBMask may be derived based on the determination expression of isOOB[X] provided with a restriction of the valid range in (DecideOOB1), (DecideOOB2), and (DecideOOB3).

Alternatively, the derivation expression of OOBMask may be the following expression.

$$OOBMask[X][px][py]=((xRefLX+px<picMinX)||\\(yRefLX+py<PieMinY)||(xRefLX+px+(bW<<\log\\2MVPREC)-1>=picMaxX)||(yRefLX+py+\\(bH<<\log 2MVPREC)-1>=picMaxY))?1:0$$

Alternatively, the derivation expression of OOBMask may be the following expression.

$$OOBMask[X][px][py]=((xRefLX+px<=picMinX)||\\(yRefLX+py<=PieMinY)||(xRefLX+px+\\(bW<<\log 2MVPREC)-1>=picMaxX)||(yRe-\\fLX+py+(bH<<\log 2MVPREC)-\\1>=picMaxY))?1:0$$

Alternatively, OOBMask may be derived as follows with omission of terms for rounding.

$$picMaxX=(picW-1)<<\log 2MVPREC$$

$$picMaxY=(picH-1)<<\log 2MVPREC$$

$$OOBMask[X][px][py]=((xRefLX+px<0)||(yRefLX+\\py<0)||(xRefLX+(bW<<\log 2MVPREC)-1)>pic-\\MaxX)||(yRefLX+(bH<<\log 2MVPREC)-1)>\\pixMaxY))?1:0$$

Alternatively, OOBMask may be derived by using the motion vectors in integer units.

xRefLX=xPb+(mvLX[0]>>log 2MVPREC)

yRefLX=yPb+(mvLX[1]>>log 2MVPREC)

OOBMask[X][px][py]=((xRefLX+px<0)||(yRefLX+
py<0)||(xRefLX+px+bW-1>=picW-1)||(yRe-
fLX+py+bH-1>=picH-1))?1:0

Alternatively, the derivation expression of OOBMask may be the following expression.

OOBMask[X]=((xRefLX+px<=0)||(yRefLX+py<=0)||
(xRefLX+px+bW-1>=picW-1)||(yRefLX+py+
bH-1>=picH-1))?1:0

The OOB mask derivation unit 30922 may derive OOB-Mask[X] as a mask in a unit of N×M pixels. In other words, one mask value is associated with OOB determination of N×M pixels. In this case, the size of OOBMask[X] is (bW/N)*(bH/M). Each mask value OOBMask[X][x][y] (x=0, . . . , bW/N-1, y=0, . . . , bH/M-1) is derived as follows, for example.

xRefLX=(xPb<<log 2MVPREC)+mvLX[0]

yRefLX=(yPb<<log 2MVPREC)+mvLX[1]

OOBMask[X][px][py]=((xRefLX+px*N<picMinX)
(yRefLX+py*M<picMinY)||(xRefLX+px*N+
N>=picMaxX)(yRefLX+py*M+M>=picMaxY))?
1:0

Here, px=0, . . . , bW/N-1, and py=0, bH/M-1. The terms of N and M may be omitted. In the above, OOBMask is derived based on the determination expression of isOOB[X] in (DecideOOB1). In addition to this, OOBMask may be derived based on the determination expression of isOOB[X] in (DecideOOB2) and (DecideOOB3). Moreover, OOB-Mask may be derived based on the determination expression of isOOB[X] provided with a restriction of the valid range in (DecideOOB1), (DecideOOB2), and (DecideOOB3).

Alternatively, the derivation expression of OOBMask may be the following expression.

OOBMask[X][px][py]=((xRefLX+px*N<picMinX)
(yRefLX+py*N<picMinY)||(xRefLX+px*N+N+
bW*MVPREC-1>=picMaxX)(yRefLX+py*N+
M+bH*MVPREC-1>=picMaxY))?1:0

Alternatively, OOBMask may be derived as follows with omission of terms for rounding.

picMaxX=(picW-1)<<log 2MVPREC picMaxY=(picH-1)<<log 2MVPREC

OOBMask[X][px][py]=((xRefLX+px*N<0)II(yRe-
fLX+py*N<0)(xRefLX+px*N+N+
bW*MVPREC-1>picMaxX)(yRefLX+py*N+
M+bH*MVPREC-1>pixMaxY))?1:0

Alternatively, OOBMask may be derived by using the motion vectors in integer units.

xRefLX=xPb+(mvLX[0]>>log 2MVPREC)

yRefLX=yPb+(mvLX[1]>>log 2MVPREC)

OOBMask[X][Px][PY]=((xRefLX+px*N<0)||(YRe-
fLX+py*N<0)||(xRefLX+px*N+N+bW-
1>=picW-1)||(yRefLX+py*N+M+bH-1>=picH-
1))?1:0

With this, the masks have equal values in units of N×M pixels, and therefore memory necessary for the masks can be reduced and also the amount of calculation can be reduced.

Generation of OOB Prediction Image

In a case of the bi-prediction, the motion compensation unit 3091 (interpolation image generation unit 3091) sets Pred[ ][ ] derived in the above (Expression MC-1) equal to interpolation images PredL0[ ][ ] and PredL1[ ][ ] for each L0 list and L1 list. Then, the weighted prediction unit 3094 generates an interpolation image Pred[ ][ ] from PredL0[ ] [ ] and PredL1[ ][ ]. In a case that the reference block of the bi-prediction is a target of the OOB processing, OOBMask [X] corresponding to the reference block is used in generation of the prediction image. In this case, Pred[ ][ ] is derived as follows.

```
if (OOBMask[0][px][py] && !OOBMask[1][px][py]) { (Expression WP-1)
    Pred[px][py] = (PredL1[px][py] + offset1) >> shift1
} else if (!OOBMask[0][px][py] && OOBMask[1][px][py]) {
    Pred[px][py] = (PredL0[px][py] + offset1) >> shift1
else
    Pred[px][py] = (PredL0[px][py] + PredL1[px][py] + offset2) >> shift2
}
```

Here, px=0, . . . , bW-1, and py=0, bH-1. shift1=Max(2, 14-bitDepth), shift2=Max(3, 15-bitDepth), offset1=1<< (shift1-1), and offset2=1<<(shift2-1). Note that shift1 is shift (for example, 14-bitDepth) for restoring interpolation image bit depth (for example, 14 bits) back to the original bit depth. shift2 is a right shift amount serving as an average simultaneously with restoring back to the original bits, and offset1 offset2 are rounding values in a case that right shift is performed by shift1 and shift2, respectively.

Note that the above processing may be switched depending on whether explicit weighted bi-prediction (BCW) in units of CUs or intra inter combined prediction (CIIP) (combined inter-picture merge and intra-picture prediction) is used. bcwIdx is an index indicating the weight of BCW. ciip_flag is a flag indicating on or off of CIIP. In a case that bcwIdx==0 or the CIIP flag (ciip_flag) is 1, the processing of the above (Expression WP-1) is performed. In other cases, the following processing is performed.

w1=bcwWLut[bcwIdx]

w0=(8-w1)

Here, bcwWLut[k]={4, 5, 3, 10, -2}

```
if (OOBMask[0][px][py] && ! OOBMask[1][px][py]) {
    Pred[px][py] = (PredL1[px][py] + offset1) >> shift1
} else if (!OOBMask[0][px][py] && OOBMask[1][px][py]) {
    Pred[px][py] = (PredL0[px][py] + offset1) >> shift1
} else {
    Pred[px][py] = (w0 * PredL0[px][py] + w1 * PredL1[px][py] + offset3)
        >> (shift1 + 3))
}
```

Here, offset3=1<<(shift1+2).

In a case that processing is performed as follows by collectively performing processing using the flag pred-FlagLX indicating whether the LX reference picture is used and OOBMask in units of blocks in one branch, there is an effect that the amount of processing can be reduced.

```
if ((predFlagL0 == 1 && predFlagL1 == 0) | | (!OOBMask[0][px][py]
&&
OOBMask[1][px][py])) { (Expression WP-2)
    Pred[px][py] = (PredL0[px][py] + offset1) >> shift1
} else if ((predFlagL0 == 0 && predFlagL1 == 1) | (OOBMask[0][px][py]
&& !OOBMask[1][px][py])) {
    Pred[px][py] = (PredL1[px][py] + offset1) >> shift1
```

```
} else if (bcwIdx == 0 || ciip_flag == 1) {
  Pred[px][py] =(PredL0[px][py] + PredL1[px][py] + offset2) >> shift2
} else { // bcwIdx != 0 and ciip_flag == 0)
  Pred[px][py] = (w0 * PredL0[px][py] + w1 * PredL1[px][py] +
    offset3) >> (shift1 + 3
}
```

Omission Configuration

In weighted prediction for generating the prediction image using a weighted sum of reference blocks in two reference pictures, the OOB determination unit 30921 may not apply the OOB processing to blocks. In other words, for the blocks to which the weighted prediction is applied, the OOB determination presence/absence flag isOOB[X] is set equal to false. This allows for prevention of occurrence of distortion or reduction of coding efficiency, which is caused by no use of one of the reference blocks to which the bi-directional weighted prediction is applied. Such weighted prediction includes Bi-prediction with CU-level Weight (BCW) prediction and Weighted prediction (WP) prediction.

In the BCW prediction, weight coefficients (w0, w1) are selected in units of blocks, and an L0 interpolation image and an L1 interpolation image in the bi-prediction are multiplied by the weights, and thereby a prediction image is generated. The parameter decoder 302 decodes, from the coded data, a parameter bcw_idx indicating the weight coefficients in the coding unit CU. The parameter coder 111 codes bcw_idx. In a case of the merge prediction, bcwIdx of a reference block (neighboring block) is set equal to bcwIdx of the target block. In other cases, bcw_idx is set equal to bcwIdx of the target block. In a case that bcwIdx !=0, the BCW prediction is applied to the CU. In a case that the BCW prediction is applied (bcwIdx !=0), the OOB determination unit 30921 sets isOOB[X] equal to false.

In the WP prediction, weight coefficients (we0, we1) and offsets (offset0, offset1) for each reference picture are switched in units of slices, the weight coefficients and the offsets are selected based on the reference picture index in units of CUs, the L0 interpolation image and the L1 interpolation image are multiplied by the weights, and thereby a prediction image is generated. The parameter decoder 302 decodes, from the coded data of the PPS, pps_weighted_bipred_flag indicating whether to apply the WP prediction to a B picture. In a case that pps_weighted_bipred_flag==1, the WP prediction is applied to the B picture of the PPS.

(we0, we1) and (offset0, offset1) are weight coefficients and offsets decoded from the coded data in units of slices, respectively, and are derived in accordance with the reference picture index.

In a case that the OOB determination unit 30921 applies explicit WP prediction (pps_weighted_bipred_flag==1), the OOB determination unit 30921 sets isOOB[X] equal to false. Note that, in a case that two reference pictures are not used (one of predFlagLX (X=0, 1) is 0), the OOB processing may be applied.

In a case that the above omission configuration is used, OOBMask[0] and OOBMask[1] are not set equal to 1 together, and thus the weighted prediction unit 3094 can derive the interpolation image according to the following branch processing.

```
if (OOBMask[0][px][py]) {
  Pred[px][py] = (we1 * PredL1[px][py] + offset1) >> shift1
} else if (OOBMask[1][px][py]) {
  Pred[px][py] = (we0 * PredL0[px][py] + offset0) >> shift1
} else {
  if (bcwIdx == 0 && pps_weighted_bipred_flag == 1) {
    Pred[px][py] = (we0 * PredL0[px][py] + we1 * PredL1[px][py] +
      offset2) >> shift2
  } else { // bcwIdx != 0 and pps_weighted_bipred_flag == 0)
    Pred[px][py] = (w0 * PredL0[px][py] + w1 * PredL1[px][py] +
      offset3) >> (shift1 + 3))
  }
}
```

It is appropriate that PredL0, PredL1, and PredBI be calculated in advance, and final Pred be derived in the following mask processing.

First, PredL0, PredL1, and PredBI are calculated.

PredL0[px][py]=(we0*PredL0[px][py]+
  offset0)>>shift1

PredL1[px][py]=(we1*PredL1[px][py]+
  offset1)>>shift1

PredBI[px][py]=(we0*PredL0[px][py]+we1*PredL1
  [px][py]+offset2)>>shift2(in a case of WP prediction)

PredBI[px][py]=(w0*PredL0[px][py]+w1*PredL1[px]
  [py]+offset3)>>(shift1+3))(in a case of BCW prediction)

Next, in a case that binary bit masks of "1111111111b" and "0000000000b" having a BitDepth length are used as values of OOBMask[0][px][py] and OOBMask[1][px][py], final Pred is derived according to the following processing.

Pred[px][py]=(PredBI[px][py]&(!OOBMask[0][px]
  [py]&!OOBMask[1][px][py]))+(PredL0[px]
  [py]& OOBMask[0][px][py])+(PredL1[px][py]&
  OOBMask[1][px][py])

Note that, in a case that true has a value of 1 (true=1) and false has a value of 0 (false=0), bit mask values "0000000000b" and "1111111111b" may be generated from 0 and 1, and the following processing may be performed. Here, "+" may be "|" (the same applies to mask operation processing in the description below).

Pred[px][py]=(Expression excl-1)(PredBI[px][py]&
  (0-((!OOBMask[0][px][py]&!OOBMask[1][px]
  [py])?1:0)))+(PredL0[px][py]&(0-(OOBMask[0]
  [px][py]?1:0)))+(PredL1[px][py]&(0-
  (OOBMask[1][px][py]?1:0)))

In order to create the mask having a bit width of at least a bit depth of a pixel value, the above expression includes calculation of transforming the binary (0 or 1) mask into 0 (all of the bits are 0, the pixel value is invalidated) or into −1 (all of the bits are 1, the pixel value is validated). Derivation of the prediction image is not limited thereto, and such calculation may be used that a term invalidated due to the OOB mask among three terms corresponding to PredBI, PredL0, and PredL1 is set equal to 0. For example, in a case that the bit depth of the pixel value is at most 16 bits, the following expression may be used.

Pred[px][py]=(PredBI[px][py]&((!OOBMask[0][px]
  [py]&!OOBMask[1][px][py])?0xFFFF:0))+
  (PredL0[px][py]&(OOBMask[0][px][py]
  ?0xFFFF:0))+(PredL1[px][py]&(OOBMask[1]
  [px][py]?0xFFFF:0))

Without the use of addition in combination of three terms, bit OR may be used as follows.

Pred[px][py]=(PredBI[px][py]&((!OOBMask[0][px]
  [py]&!OOBMask[1][px][py])?0xFFFF:0))|

(PredL0[px][py]&(OOBMask[0][px][py]?
0xFFFF:0))|(PredL1[px][py]&(OOBMask[1][px]
[py]?0xFFFF:0))

Alternatively, multiplication may be used.

Pred[px][py]=(PredBI[px][py]*((!OOBMask[0][px]
[py]&!OOBMask[1][px][py])?1:0))+(PredL0[px]
[py]*(OOBMask[0][px][py]?1:0))+(PredL1[px]
[py]*(OOBMask[1][px][py]?1:0))

According to the above, exclusive processing can be simplified. Owing to the exclusive processing, processing can be further simplified than operation of (Expression excl-1).

The weighted prediction unit 3094 may refer to the value of isOOB and separate processing in advance. For example, the following may be performed. In this manner, in a case that isOOB[X] is false, there is no need to refer to OOBMask[X][px][py] for each pixel, and thus there is an effect that the amount of calculation can be reduced. For example, in a case that weights are not used, the prediction image may be generated as follows.

```
if (isOOB[0] && !isOOB[1]) {
  if (OOBMask[0][px][py]) {
    Pred[px][py] =(PredL1[px][py] + offset1) >> shift1
  } else {
    Pred[px][py] = (PredL0[px][py] + PredL1[px][py] + offset2) >> shift2
  }
} else if (! isOOB[0] && isOOB[1]) {
  if (OOBMask[1][px][py]) {
    Pred[px][py] = (PredL0[px][py] + offset1) >> shift1
  } else {
    Pred[px][py] = (PredL0[px][py] + PredL1[px][py] + offset2) >> shift2
  }
} else if (isOOB[0] && isOOB[1]) {
  if (OOBMask[0][px][py] && !OOBMask[1][px][py]) {
    Pred[px][py] = (PredL1[px][py] + offset1) >> shift1
  } else if (!OOBMask[0][px][py] && OOBMask[1][px][py]) {
    Pred[px][py] = (PredL0[px][py] + offset1) >> shift1 } else {
    Pred[px][py] = (PredL0[px][py] + PredL1[px][py] + offset2) >> shift2
  }
} else {
  Pred[px][py] = (PredL0[px][py] + PredL1[px][py] + offset2) >> shift2
}
```

For example, in a case of the explicit weighted bi-prediction (BCW) in units of CUs (bcwIdx !=0 and pps_weighted_bipred_flag==0), the prediction image may be generated as follows.

```
if (isOOB[0] && !isOOB[1]) {
  if (OOBMask[0][px][py]) {
    Pred[px][py] = (PredL1[px][py] + offset1) >> shift1
  } else {
    Pred[px][py] = (w0 * PredL0[px][py] + w1 * PredL1[px][py] + offset3) >> (shift1 + 3)
  }
} else if (!isOOB [0] && isOOB[1]) {
  if (OOBMask[1][px][py]) {
    Pred[px][py] = (PredL0[px][py] + offset1) >> shift1
  } else {
    Pred[px][py] = (w0 * PredL0[px][py] + w1 * PredL1[px][py] + offset3) >> (shift1 + 3)
  }
} else if (isOOB[0] && isOOB[1]) {
  if (OOBMask[0][px][py] && !OOBMask[1][px][py]) {
    Pred[px][py] = (PredL1[px][py] + offset1) >> shift1
  } else if (!OOBMask[0][px][py] && OOBMask[1][px][py]) {
Pred[px][py] = (PredL0[px][py] + offset1) >> shift1
  } else {
    Pred[px][py] = (w0 * PredL0[px][py] + w1 * PredL1[px][py] + offset3) >> (shift1 + 3)
  }
} else {
  Pred[px][py] = (w0 * PredL0[px][py] + w1 * PredL1[px][py] + offset3) >> (shift1 + 3)
}
```

For example, in a case of the WP prediction (bcwIdx==0 and pps_weighted_bipred_flag==1), the prediction image may be generated as follows.

```
if (isOOB[0] && !isOOB[1]) {
  if (OOBMask[0][px][py]) {
    Pred[px][py] = (we1 * PredL1[px][py] + offset1) >> shift1
  } else {
    Pred[px][py] = (we0 * PredL0[px][py] + we1 * PredL1[px][py] + offset2) >> shift2
  }
} else if (!isOOB [0] && isOOB[1]) {
  if (OOBMask[1][px][py]) {
    Pred[px][py] = (we0 * PredL0[px][py] + offset1) >> shift1
  } else {
    Pred[px][py] = (we0 * PredL0[px][py] + we1 * PredL1[px][py] + offset2) >> shift2
  }
} else if (isOOB[0] && isOOB[1]) {
  if (OOBMask[0][px][py] && !OOBMask[1][px][py]) {
    Pred[px][py] = (we1 * PredL1[px][py] + offset1) >> shift1
  } else if (!OOBMask[0][px][py] && OOBMask[1][px][py]) {
    Pred[px][py] = (we0 * PredL0[px][py] + offset1) >> shift1
  } else {
    Pred[px][py] = (we0 * PredL0[px][py] + we1 * PredL1[px][py] + offset2) >> shift2
  }
} else {
  Pred[px][py] = (we0 * PredL0[px][py] + we1 * PredL1[px][py] + offset2) >> shift2
}
```

The inter prediction image generation unit 309 outputs the generated prediction image of the block to the addition unit 312.

Configuration of Video Coding Apparatus

Figure 7:
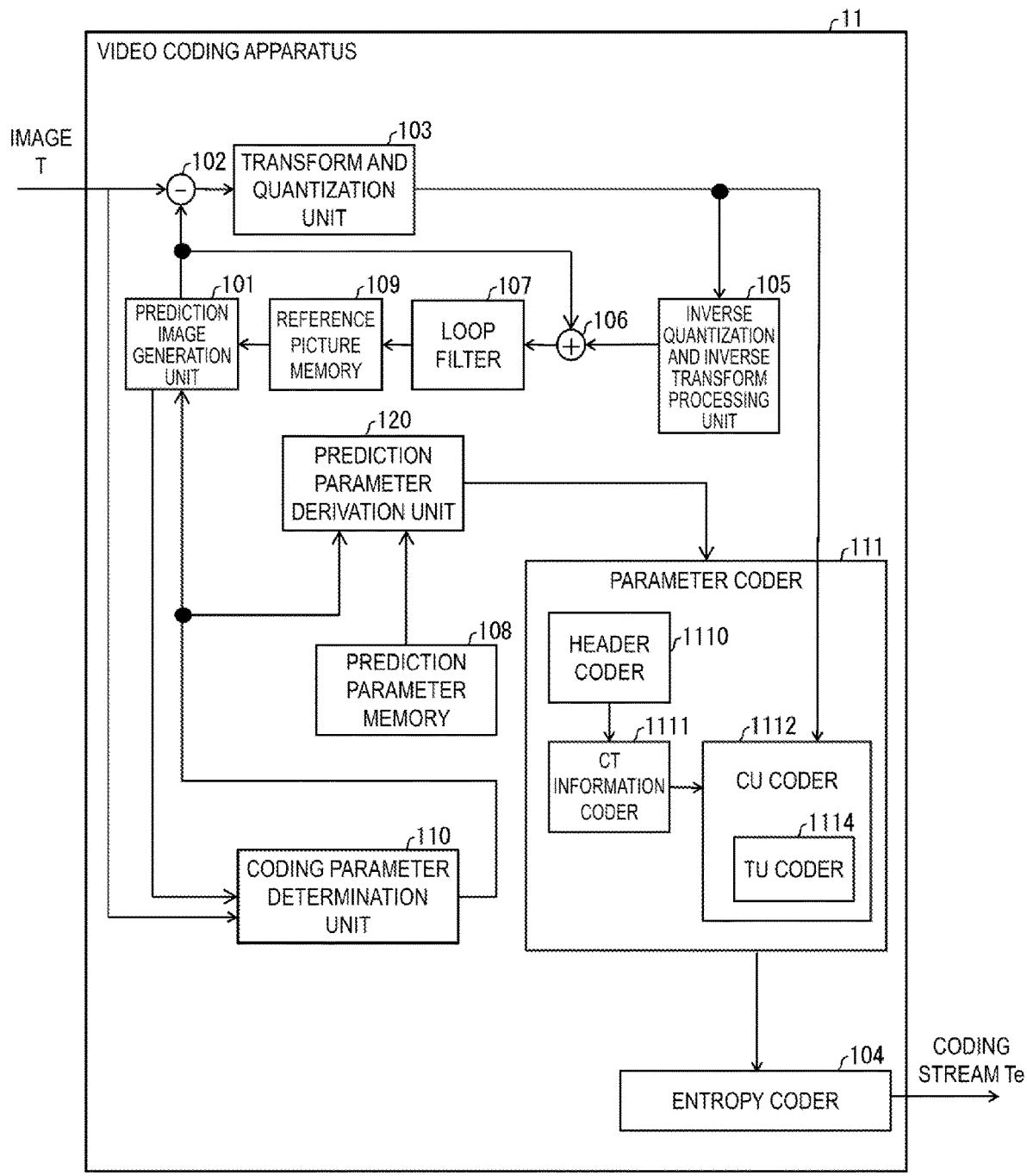
FIG. 7 is a block diagram illustrating a configuration of a video coding apparatus.
Figure 8:
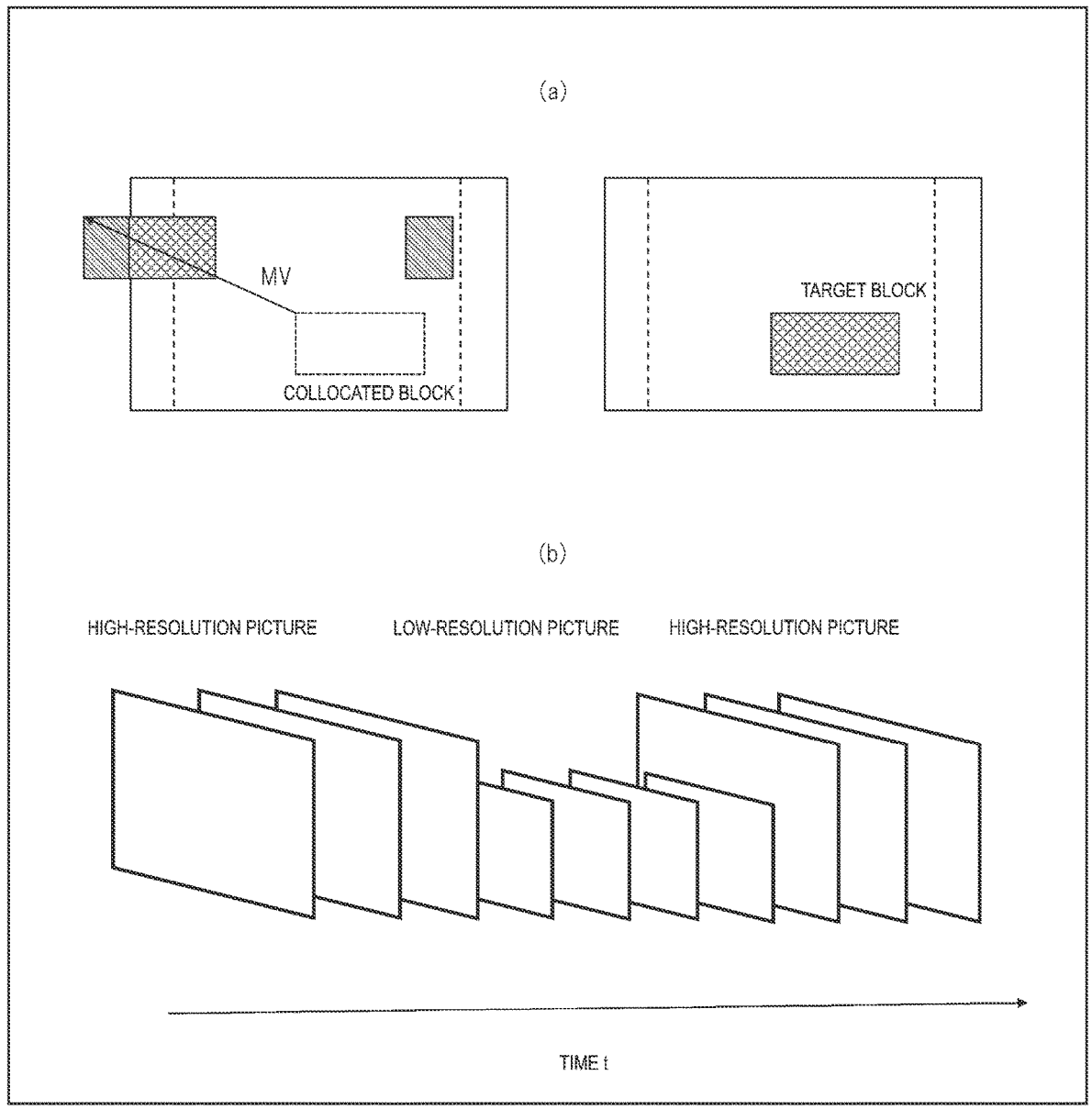
FIG. 8 is a diagram illustrating an example of wrap-around processing and reference picture resampling processing of prior art.

Next, a configuration of the video coding apparatus 11 according to the present embodiment will be described. FIG. 7 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and the intra prediction image generation unit already described, and description of these units is omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the parameter coder 111 and the inverse quantization and inverse transform processing unit 105.

The transform and quantization unit 103 includes a separable transform processing unit (first transform processing unit), a non-separable transform processing unit (second transform processing unit), and a scaling unit.

The separable transform processing unit applies separable transform to the prediction error. The scaling unit performs scaling on the transform coefficient using a quantization matrix.

The inverse quantization and inverse transform processing unit 105 is the same as the inverse quantization and inverse transform processing unit 311 in the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantization transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as the inter prediction parameters (predMode, general_merge_flag, merge_idx, inter_pred_idc, refIdxLX, mvp_LX_idx, and mvdLX), the intra prediction parameters, and the quantization transform coefficients.

The parameter coder 111 inputs the quantization transform coefficient and the coding parameters (split information and prediction parameters) to the entropy coder 104. The entropy coder 104 entropy-codes the quantization transform coefficient and the coding parameters to generate a coding stream Te and outputs the coding stream Te.

The prediction parameter derivation unit 120 is a component including the inter prediction parameter coder 112 and the intra prediction parameter coder, and derives an intra prediction parameter and an inter prediction parameter from the parameters input from the coding parameter determination unit 110. The intra prediction parameter and inter prediction parameter derived are output to the parameter coder 111.

Configuration of Inter Prediction Parameter Coder

The inter prediction parameter coder 112 includes a parameter coding controller 1121 and an inter prediction parameter derivation unit 303. The inter prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder

The intra prediction parameter coder includes a parameter coding controller and an intra prediction parameter derivation unit. The intra prediction parameter derivation unit has a configuration common to the video decoding apparatus.

However, unlike in the video decoding apparatus, the coding parameter determination unit 110 and the prediction parameter memory 108 provide input to the inter prediction parameter derivation unit 303 and the intra prediction parameter derivation unit, and output from the inter prediction parameter derivation unit 303 and the intra prediction parameter derivation unit is provided to the parameter coder 111.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient $\lambda$. by a square error. The code amount is an amount of information of the coding stream Te obtained by performing entropy coding on a quantization error and a coding parameter. The square error is the square sum of the prediction errors calculated in the subtraction unit 102. The coefficient $\lambda$, is a real number greater than a preset zero. The coding parameter determination unit 110 selects a set of coding parameters of which cost value calculated is a minimum value. The coding parameter determination unit 110 outputs the determined coding parameters to the prediction parameter derivation unit 120.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" mentioned here refers to a computer system built into either the video coding apparatus 11 or the video decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. The above-described program may be one for realizing some of the above-described functions, and also may be one capable of realizing the above-described functions in combination with a program already recorded in a computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that, with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

The embodiment of the present invention is not limited to the above-described embodiment, and various modifications are possible within the scope of the claims. That is, an embodiment obtained by combining technical means modified appropriately within the scope of the claims is also included in the technical scope of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

31 Video decoding apparatus
301 Entropy decoder
302 Parameter decoder
3022 CU decoder
3024 TU decoder
303 Inter prediction parameter derivation unit
305, 107 Loop filter
306, 109 Reference picture memory
307, 108 Prediction parameter memory
308, 101 Prediction image generation unit
309 Inter prediction image generation unit
3092 OOB processing unit
30921 OOB determination unit
30922 OOB mask derivation unit
311, 105 Inverse quantization and inverse transform processing unit
312, 106 Addition unit
320 Prediction parameter derivation unit
11 Video coding apparatus
102 Subtraction unit
103 Transform and quantization unit
104 Entropy coder
110 Coding parameter determination unit
111 Parameter coder
112 Inter prediction parameter coder
120 Prediction parameter derivation unit

The invention claimed is:

1. A video decoding apparatus comprising:
an out-of-boundary (OOB) determination circuit configured to determine, in a bi-prediction, whether a reference block is a target of OOB processing by comparing coordinates of a reference block boundary with coordinates of a picture boundary; and
an OOB mask derivation circuit configured to derive mask data indicating whether a pixel is available by comparing coordinates of the pixel included in the reference block with the coordinates of the picture boundary or coordinates of a region boundary, wherein
the OOB determination circuit further determines, based on top left coordinates and a block size of the reference block that are derived from a motion vector of a target block, whether the reference block includes a region that is out of a valid range,
the OOB mask derivation circuit further derives, based on the determination of whether the reference block includes the region that is out of the valid range, mask data indicating whether a pixel at each position in the reference block is out of the valid range, and
in a case of the bi-prediction, the video decoding apparatus generates a prediction image based on the mask data indicating whether the pixel at each position in the reference block is out of the valid range.

2. The video decoding apparatus according to claim 1, wherein
the OOB determination circuit compares a valid region of an L0 reference region and a valid region of an L1 reference region, and invalidates an OOB determination for a reference picture whose a valid region of a reference region is larger.

3. The video decoding apparatus according to claim 2, wherein
the OOB determination circuit further determines sizes of the valid regions by comparing areas of the valid regions of the L0 reference region and the L1 reference region.

4. The video decoding apparatus according to claim 2, wherein
the OOB determination circuit further determines sizes of the valid regions by comparing widths or heights of the valid regions of the L0 reference region and the L1 reference region.

5. The video decoding apparatus according to claim 1, wherein
the OOB determination circuit invalidates an OOB determination in a block to which a weighted bi-prediction, which is a Bi-prediction with CU-level Weight (BCW), on a per block basis is applied.

6. The video decoding apparatus according to claim 1, wherein
the OOB mask derivation circuit further derives a mask per N×M pixels,
each of N and M is a positive integer, and
the N×M pixels is a unit of the mask.

7. The video decoding apparatus according to claim 1, wherein
the OOB determination circuit invalidates an OOB determination in a case that the target block has a prescribed size or less.

8. A video coding apparatus comprising:
an out-of-boundary (OOB) determination circuit configured to determine, in a bi-prediction, whether a reference block is a target of OOB processing by comparing coordinates of a reference block boundary with coordinates of a picture boundary; and
an OOB mask derivation circuit configured to derive mask data indicating whether a pixel is available by comparing coordinates of the pixel included in the reference block with the coordinates of the picture boundary, wherein
the OOB determination circuit further determines, based on top left coordinates and a block size of the reference block that are derived from a motion vector of a target block, whether the reference block includes a region that is out of a valid range,
the OOB mask derivation circuit further derives, based on the determination of whether the reference block includes the region out of the valid range, mask data indicating whether a pixel at each position in the reference block is out of the valid range, and
in a case of the bi-prediction, the video coding apparatus generates a prediction image based on the mask data indicating whether the pixel at each position in the reference block is out of the valid range.

* * * * *